(12) United States Patent
Khajehoddin et al.

(10) Patent No.: US 9,698,665 B2
(45) Date of Patent: Jul. 4, 2017

(54) DIGITAL CONTROLLER FOR A POWER CONVERTER

(71) Applicant: SPARQ Systems Inc., Kingston (CA)

(72) Inventors: Sayed Ali Khajehoddin, Edmonton (CA); Masoud Karimi Ghartemani, Mississippi State, MS (US); Praveen K. Jain, Kingston (CA); Alireza Bakhshai, Kingston (CA)

(73) Assignee: SPARQ SYSTEMS, INC., Kingston, ON (CA)

( * ) Notice: Subject to any disclaimer, the term of this patent is extended or adjusted under 35 U.S.C. 154(b) by 825 days.

(21) Appl. No.: 14/026,676

(22) Filed: Sep. 13, 2013

(65) Prior Publication Data
US 2014/0078780 A1   Mar. 20, 2014

Related U.S. Application Data

(60) Provisional application No. 61/701,003, filed on Sep. 14, 2012.

(51) Int. Cl.
*H02M 1/00* (2006.01)
*H02M 7/48* (2007.01)

(52) U.S. Cl.
CPC ............... *H02M 1/00* (2013.01); *H02M 7/48* (2013.01); *H02M 2001/0012* (2013.01); *H02M 2007/4815* (2013.01); *Y02B 70/1441* (2013.01)

(58) Field of Classification Search
CPC .. H02M 1/00; H02M 7/48; H02M 2001/0012; H02M 2007/4815; Y02B 70/1441
See application file for complete search history.

(56) References Cited

U.S. PATENT DOCUMENTS

| 4,106,015 A | * | 8/1978 | Beguin | G01S 7/026 342/365 |
| 4,839,573 A | * | 6/1989 | Wise | G05B 13/0245 318/611 |
| 5,074,403 A | * | 12/1991 | Myhre | G05D 19/02 198/751 |

(Continued)

FOREIGN PATENT DOCUMENTS

CN   102611138 A   11/2013

OTHER PUBLICATIONS

A.G. Yepes, et al., "High Performance Digital Resonant Controllers Implemented with two Integrators", Power Electronics, IEEE Transactions, 26(2), p. 563-576, 2011.

(Continued)

*Primary Examiner* — Charles Kasenge

(57) ABSTRACT

Provided are methods and circuits for a controller for a control system, comprising first and second control loops that operate substantially independently, wherein the first control loop is an amplitude control loop and the second loop is a phase or frequency control loop. In some embodiments the amplitude control loop operates at an amplitude that is proportional to an amplitude of an input signal at a fundamental system frequency and at a selected harmonic of a fundamental system frequency; and the frequency control loop operates at a fundamental system frequency and at a selected harmonic of the fundamental system frequency. The frequency control loop may adaptable to a fundamental control system frequency or to a selected harmonic of the fundamental control system frequency. The controller may be implemented as a resonant controller and used in various ac systems, and offers high structural robustness in digital implementations.

22 Claims, 15 Drawing Sheets

(56) References Cited

U.S. PATENT DOCUMENTS

| | | | | |
|---|---|---|---|---|
| 5,825,179 | A * | 10/1998 | Sherman | B82Y 10/00 324/210 |
| 7,425,873 | B2 * | 9/2008 | Yamamoto | H03F 1/32 330/302 |
| 7,647,033 | B2 * | 1/2010 | Uozumi | H03C 3/0925 327/147 |
| 8,824,174 | B2 * | 9/2014 | Lai | H02J 3/38 363/40 |
| 2005/0267695 | A1 * | 12/2005 | German | G01N 3/30 702/41 |
| 2006/0171091 | A1 * | 8/2006 | Seale | F01L 9/04 361/160 |
| 2008/0173104 | A1 * | 7/2008 | German | G01N 3/30 73/862.381 |
| 2008/0205096 | A1 * | 8/2008 | Lai | H02J 3/38 363/40 |
| 2009/0135885 | A1 * | 5/2009 | Lin | H04B 1/69 375/130 |
| 2009/0210158 | A1 * | 8/2009 | German | G01N 3/30 702/2 |

OTHER PUBLICATIONS

J. Kauraniemi, et al., "Delta Operator Realizations of Direct-form IIR Filters", Circuits and Systems II: Analog and Digital Signal Processing, IEEE Transactions, 45(1), p. 41-52, 1998.

M.J. Newman, et al., "Delta Operator Digital Filters for High Performance Inverter Applications", Power Electronics, IEEE Transactions, 18(1), p. 447-454, 2003.

V. Saez, et al., "Fixed Point Implementation of IIR Filters using Delta Operator Applied to Distributed Power Generation Systems", iECON 2010—36th Annual Conference on IEEE Industrial Electronics Society, p. 1709-1714, 2010.

J. Zeng, et al., Robust Design of the Self-Tuning Resonant Controller for AC Current Control Systems, IEEE, p. 783-788, 2005.

D. Sera et al., "Low-Cost Digital Implementation of Proportional-Resonant Current Controllers for PV Inverter Applications Using Delta Operator", IEEE, p. 2517-2522, 2005.

X. Guillaud, et al., "Use of resonant controller for grid-connected converters in case of large frequency fluctuations", Power Electronics and Applications, 2007 European Conference on, pp. 1-8, 2008.

A.V. Timbus, et al., "Adaptive resonant controller for grid-connected converters in distributed power generation systems", In Applied Power Electronics Conference and Exposition, 2006. APEC'06. Twenty-First Annual IEEE, pp. 1601-1606. IEEE, 2006.

M. Karimi-Ghartemani et al., "Linear quadratic output tracking and disturbance rejection", International Journal of control, 84:1442-1449, 2011.

M. Karimi-Ghartemani et al., "Efficient linear controller design for power electronic converters", IEEE-ICPCES, pp. 1-5, 2010.

A.G. Yepes, et al., "Correction to 'High Performance Digital Resonant Controllers Implemented with two Integrators'", Power Electronics, IEEE Transactions, 27(10), p. 4357, Oct. 2012.

\* cited by examiner

Solid: embodiments of the invention; Dashed: conventional controller

DIGITAL CONTROLLER FOR A POWER CONVERTER

RELATED APPLICATIONS

This application claims the benefit of the filing date of U.S. Application No. 61/701,003, filed on 14 Sep. 2012, the contents of which are incorporated herein by reference in their entirety.

FIELD

This invention relates to controllers for power converters. In particular, this invention provides digital controllers for resonant power converters with a high degree of robustness at both low and high sampling frequencies.

BACKGROUND

Tracking of sinusoidal commands and/or rejection of sinusoidal disturbances are desirable control objectives in many applications. Use of a proportional-integral-derivative (PID) controller does not ensure zero steady-state error in such cases. By introducing an infinite gain to the loop at its center frequency, a resonant (R) controller ensures that such an objective is achieved.

For digital controllers, field programmable gate arrays (FPGAs) are desirable for applications that demand high volume of calculations with time constraints, such as in power electronics. Such applications are becoming more important as the size and complexity of power electronic designs become critical. An example is a microinverter, which requires compact, reliable, and robust design. FPGA implementations need fixed-point calculations which require more attention in the design.

A digital resonant controller suffers from difficulties at high sampling frequencies with limited number of bits (NB) (i.e., fixed-point implementation). In such cases, an accurate realization of the controller may demand extremely high NB. Those requirements are particularly desirable in power electronic circuits with compact size. The $\delta$ operator concept is able to overcome this issue and provide an alternative representation for the controller that is implementable using lower word length. This method has a parameter $\Delta$ which must be properly designed to establish the desired tradeoff between truncation errors and word length. Another challenge with the $\delta$ operator method concerns applications where frequency fluctuations can be relatively high. The various existing methods for frequency-adaptive R controller such as in [1] and [2] cannot be applied without serious challenges. For example, the frequency appears in all the controller's parameters and, to make the controller frequency-adaptive, all parameters must be made adaptive. This is particularly demanding when a fixed-point implementation is desired.

SUMMARY

Provided herein are methods and circuits for digital control of a power converter. Embodiments may be particularly suitable for use with a resonant converter, i.e., resonant (R) controllers, however, embodiments are not limited thereto. Digital controller embodiments as provided herein may be internally nonlinear. Embodiments may be derived by transforming state variables from Cartesian coordinates to polar coordinates. Realization of the embodiments in the discrete-time domain involves nonlinear equations with trigonometric functions. Such resonant (R) controllers may be referred to herein as polar form resonant (PFR) controllers.

A PFR controller as provided herein offers advantages over a conventional R controller, such as much higher structural robustness when implemented digitally. Particularly, a PFR controller resolves the well-known structural sensitivity of the R controller for applications that need high sampling frequency and have word length limitations. Such a structural sensitivity is conventionally resolved by resorting to delta-domain realizations. A PFR controller as provided herein employs an alternative to the delta-domain realization technique, with a higher degree of robustness and simplified implementation. Moreover, a PFR controller may be enhanced to accommodate frequency variations, a feature that is not easily attainable using the delta-domain method.

Embodiments suitable for digital implementations at high sampling frequency applications and embodiments suitable for digital implementations at low sampling frequency applications are provided herein. The embodiments exhibit very high robustness. For example, in some applications, a conventional resonant controller will begin losing accurate performance when the ratio of sampling frequency to the resonant frequency decreases below 50. In contrast, for resonant controller embodiments provided herein, this ratio may be as low as 10. The embodiments are also readily upgraded to be frequency-adaptive, a feature that is desirable in control systems that operate at uncertain or slowly varying frequency, such as controllers in power systems.

Provided herein is a second-order controller for a control system, comprising: first and second control loops that operate substantially independently; wherein the first control loop is an amplitude control loop and the second loop is a phase or frequency control loop.

In one embodiment the amplitude control loop operates at an amplitude that is related to (e.g., proportional to) an amplitude of an input signal at a fundamental system frequency and at a selected harmonic of a fundamental system frequency; and the frequency control loop operates at a fundamental system frequency and at a selected harmonic of the fundamental system frequency.

In one embodiment the frequency control loop is adaptable to a fundamental control system frequency or to a selected harmonic of the fundamental control system frequency.

Embodiments may be implemented in a digital domain or an analogue domain.

In embodiments implemented digitally, the second-order controller requires a number of bits to satisfy a stability criterion; and the number of bits is less than a number of bits required by a second-order controller having a combined amplitude and frequency control loop to satisfy a stability criterion. Such a controller having a combined amplitude and frequency control loop may be a conventional linear transfer function method implementation of a resonant controller.

Embodiments implemented digitally are stable over a range of sampling frequencies; wherein the range of sampling frequencies is broader than a range of sampling frequencies over which a second-order controller having a combined amplitude and frequency control loop is stable.

Also provided is an n-order controller for a control system, comprising: at least one controller as described above; wherein n is three or more.

A second-order controller as provided herein may be used in a control system for controlling an alternating current (ac) power system. The ac power system may include, but is not limited to, one or more of a distributed generation (DG) system, a microinverter for a photovoltaic system, a grid-connected inverter, a grid-isolated inverter, an uninterruptible power supply (UPS), an off-grid DG system, a permanent magnet synchronous motor drive, an active power filter, and a flexible ac transmission system.

Also provided herein is a second-order control method for a control system, comprising: operating first and second control loops substantially independently; wherein the first control loop is an amplitude control loop and the second loop is a phase or frequency control loop.

Embodiments of the method may comprise operating the amplitude control loop at an amplitude that is related to (e.g., proportional to) an amplitude of an input signal at a fundamental system frequency and at a selected harmonic of a fundamental system frequency; and operating the frequency control loop at a fundamental system frequency and at a selected harmonic of the fundamental system frequency.

In one embodiment, operating the frequency control loop includes adapting to a fundamental control system frequency or to a selected harmonic of the fundamental control system frequency.

Embodiments of the method include operating the method in a digital domain or in an analogue domain. In digital embodiments, operating the second-order controller may require a number of bits to satisfy a stability criterion; wherein the number of bits is less than a number of bits required by a second-order controller having a combined amplitude and frequency control loop to satisfy a stability criterion.

Embodiments may include operating the second-order controller such that it is stable over a range of sampling frequencies; wherein the range of sampling frequencies is broader than a range of sampling frequencies over which a second-order controller having a combined amplitude and frequency control loop is stable.

Also provided herein is an n-order control method for a control system, comprising; operating at least one controller according to the method described herein; wherein n is three or more.

Embodiments of the method may be used to control an alternating current (ac) power system, wherein the system includes, but is not limited to, one or more of a distributed generation (DG) system, a microinverter for a photovoltaic system, a grid-connected inverter, a grid-isolated inverter, an uninterruptible power supply (UPS), an off-grid DG system, a permanent magnet synchronous motor drive, an active power filter, and a flexible ac transmission system.

BRIEF DESCRIPTION OF THE DRAWINGS

For a greater understanding of the invention and to show how it may be carried into effect, embodiments are described below, by way of example, with reference to the accompanying drawings, wherein.

Figure 1:
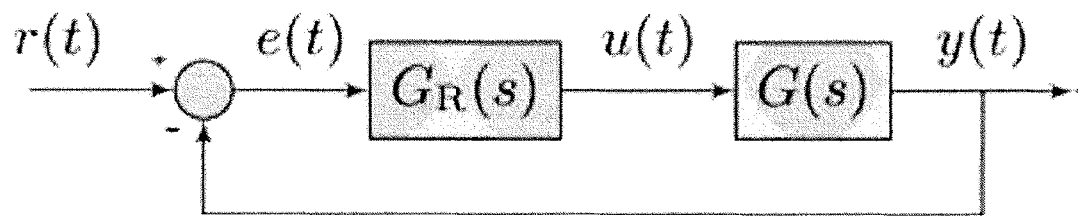
FIG. 1 is a block diagram of a standard feedback loop with a resonant controller.
Figure 12:
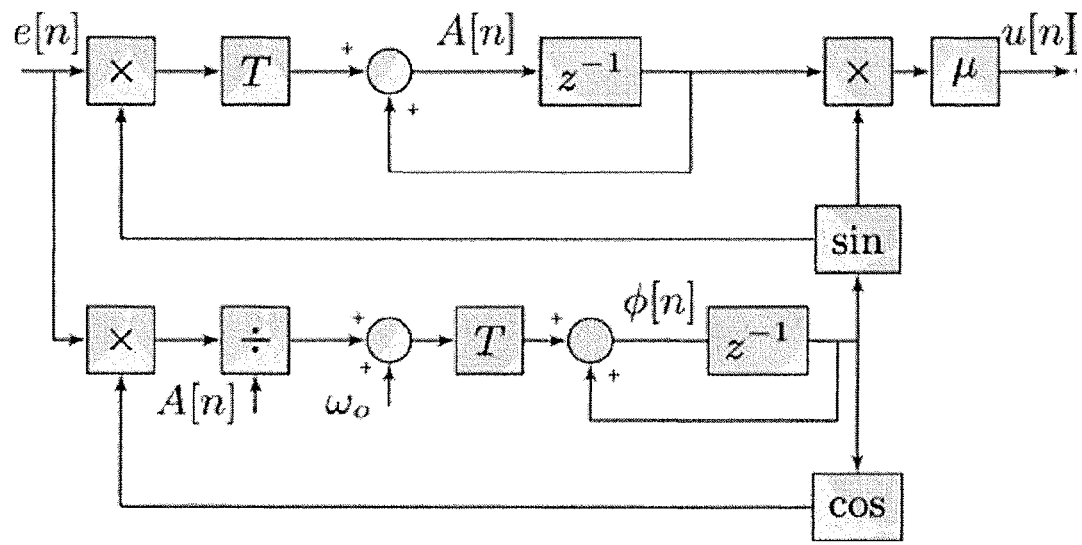
FIG. 12 is a block diagram of a digital implementation of a PFR controller according to one embodiment.
Figure 14:
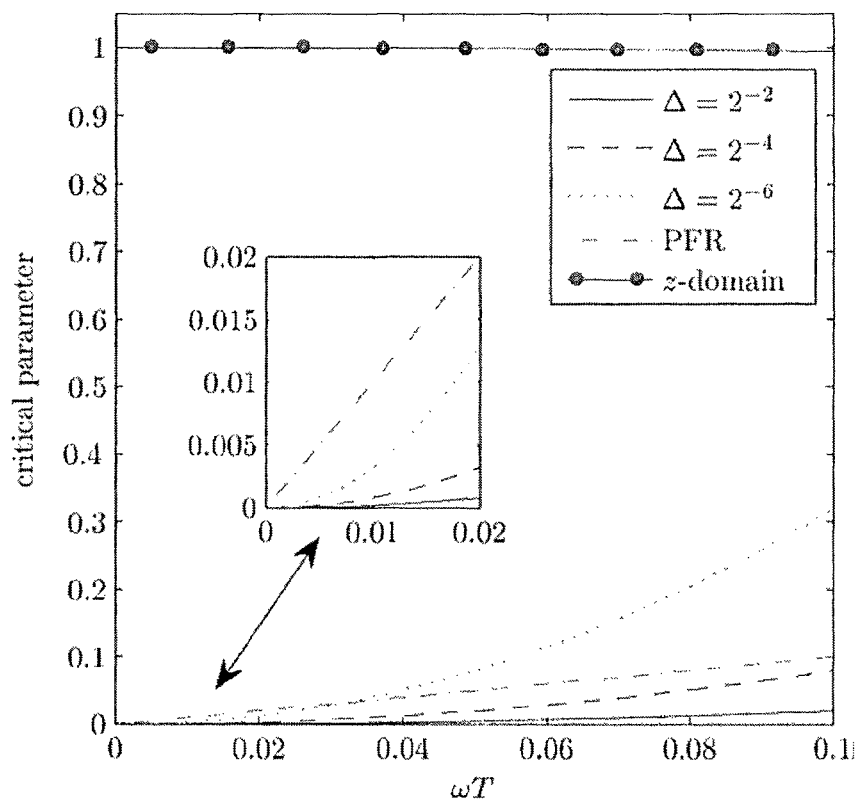
Figure 15:
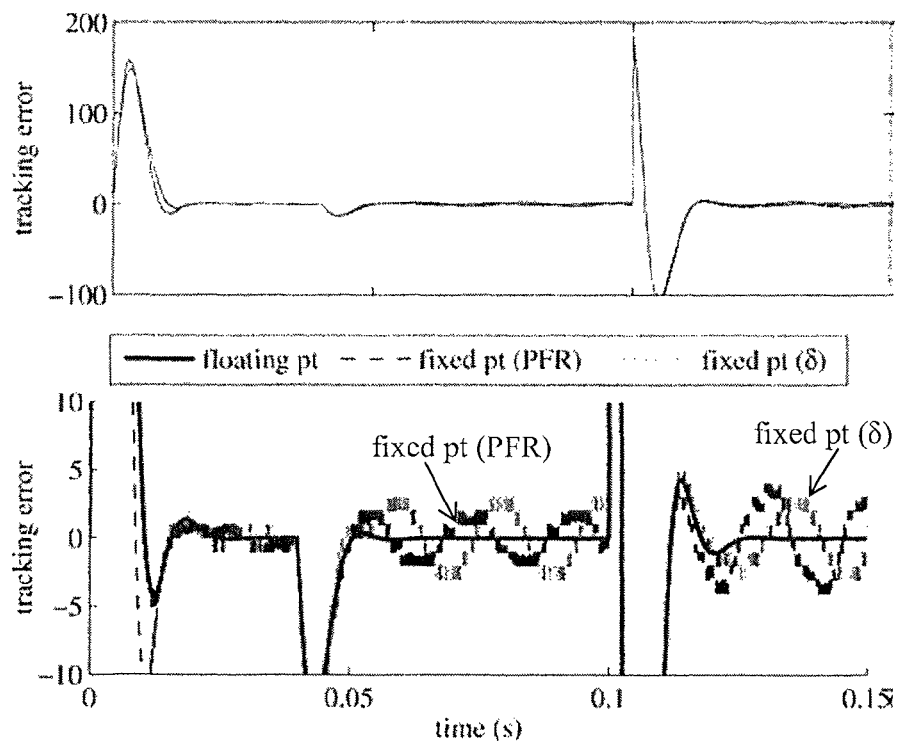
Figure 16:
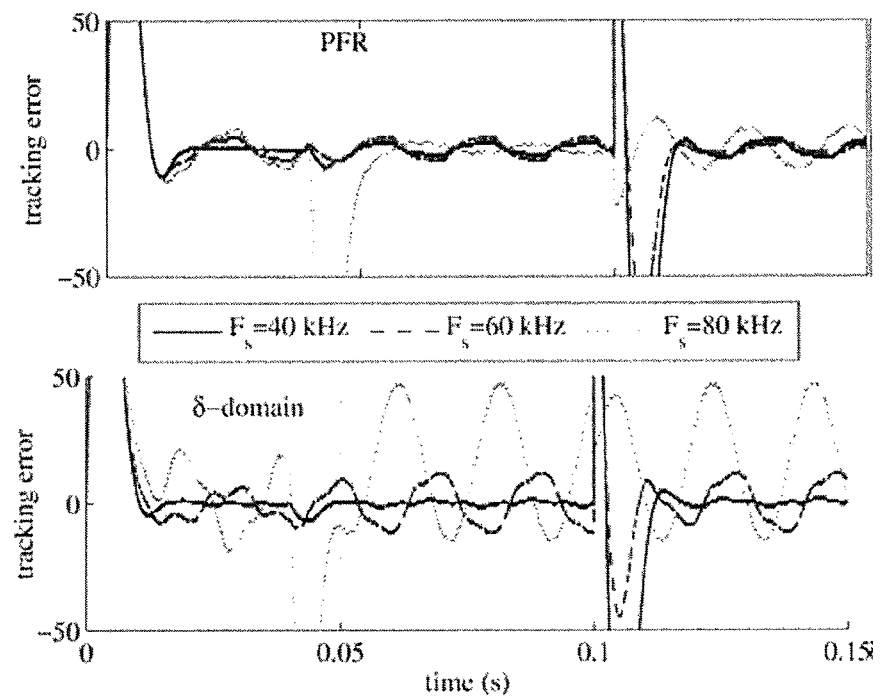
Figure 17:
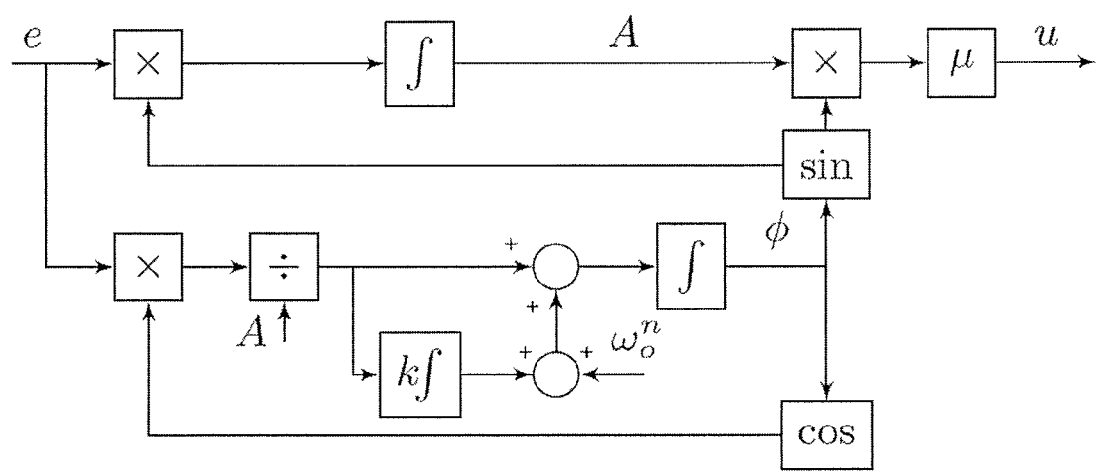
Figure 18:
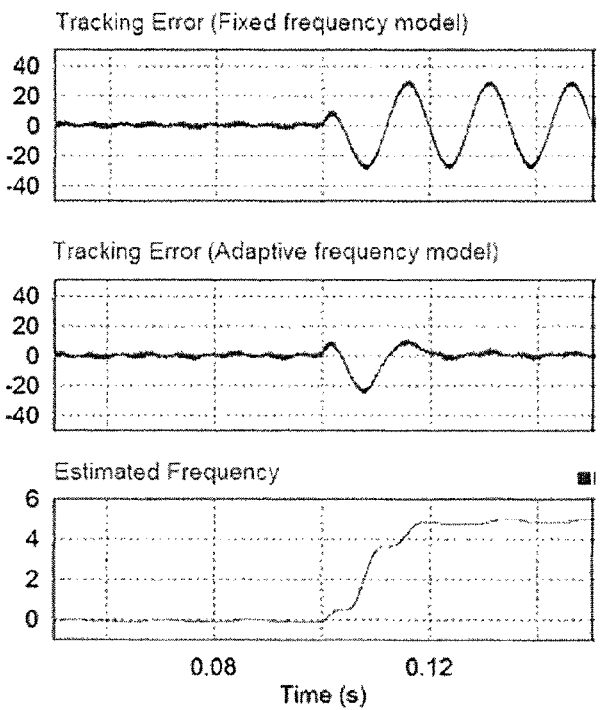
Figure 19:
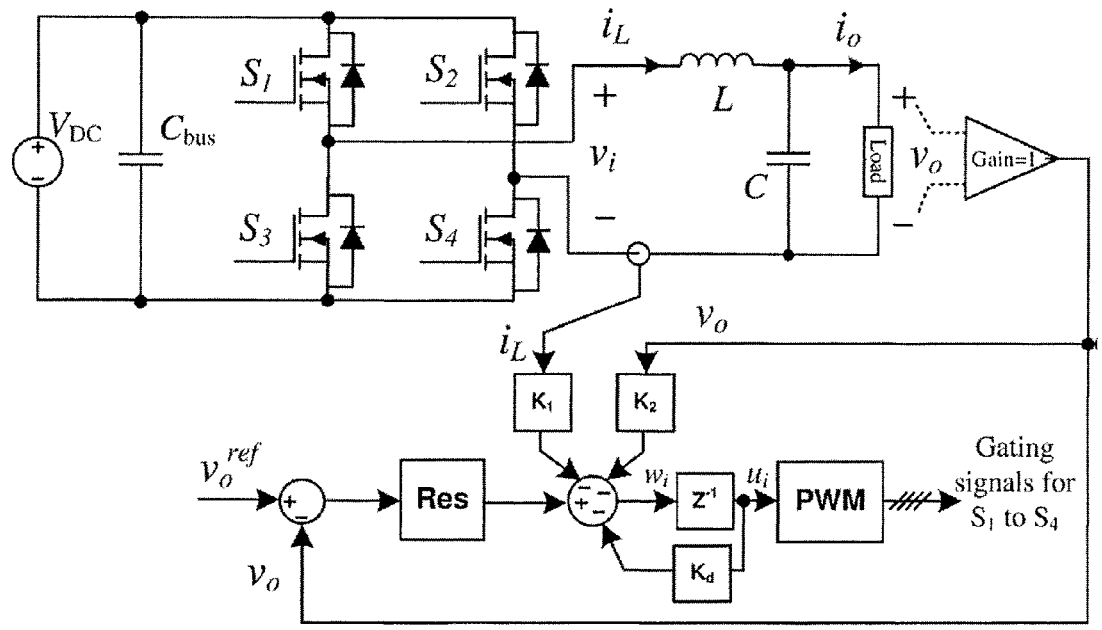
Figure 20:
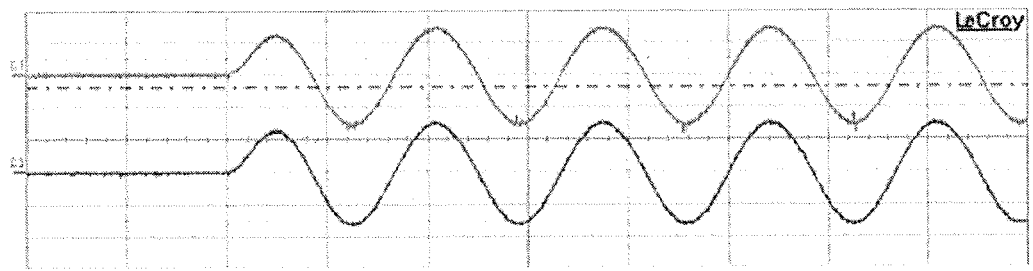
Figure 21:
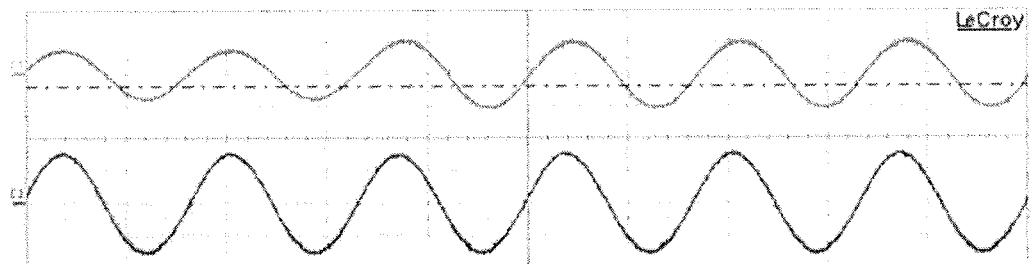
Figure 22:
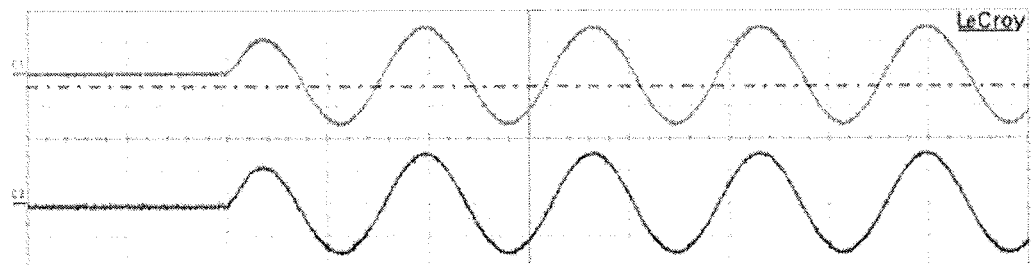
Figure 23:
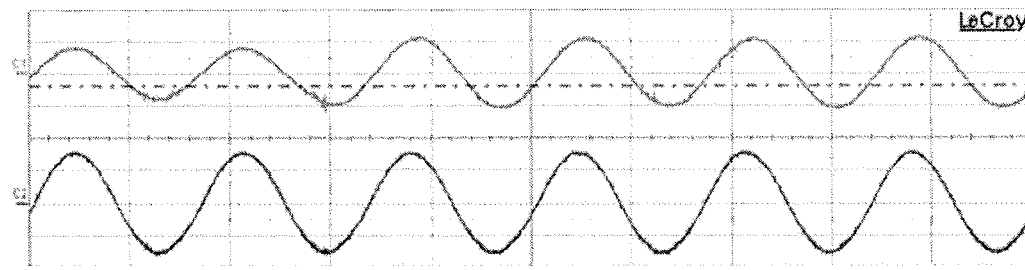
Figure 24:
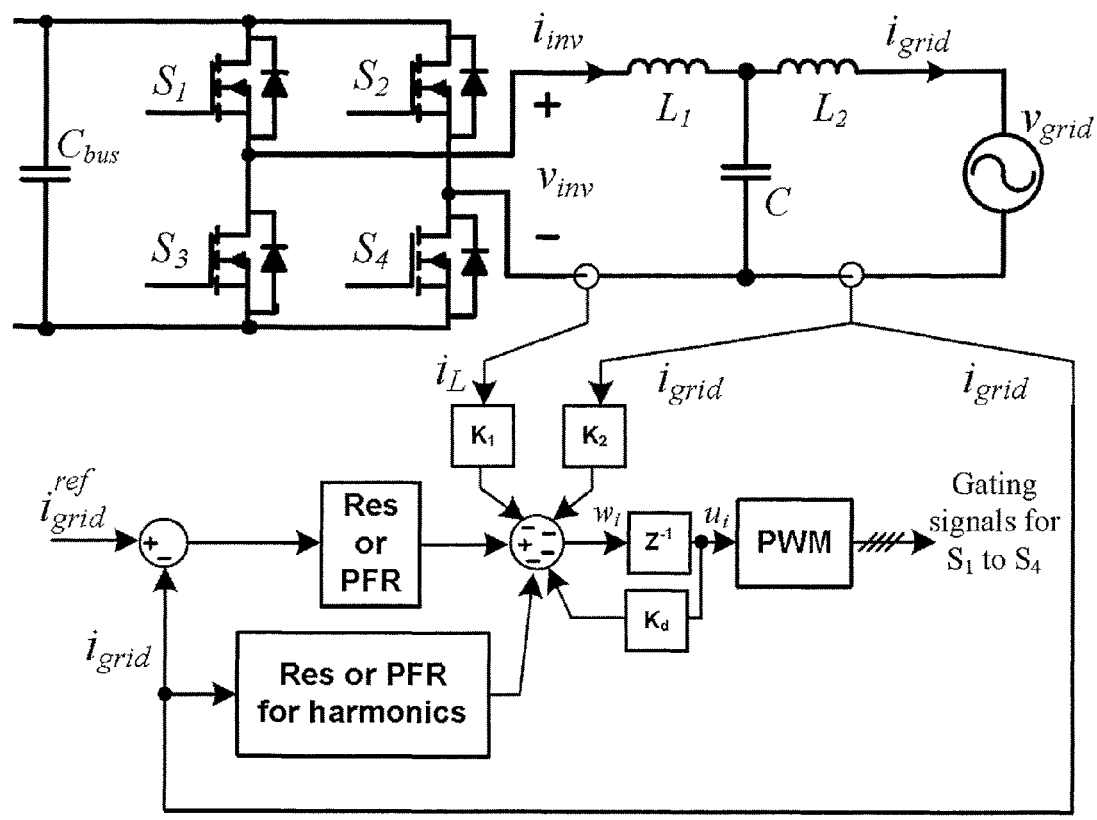
Figure 25:
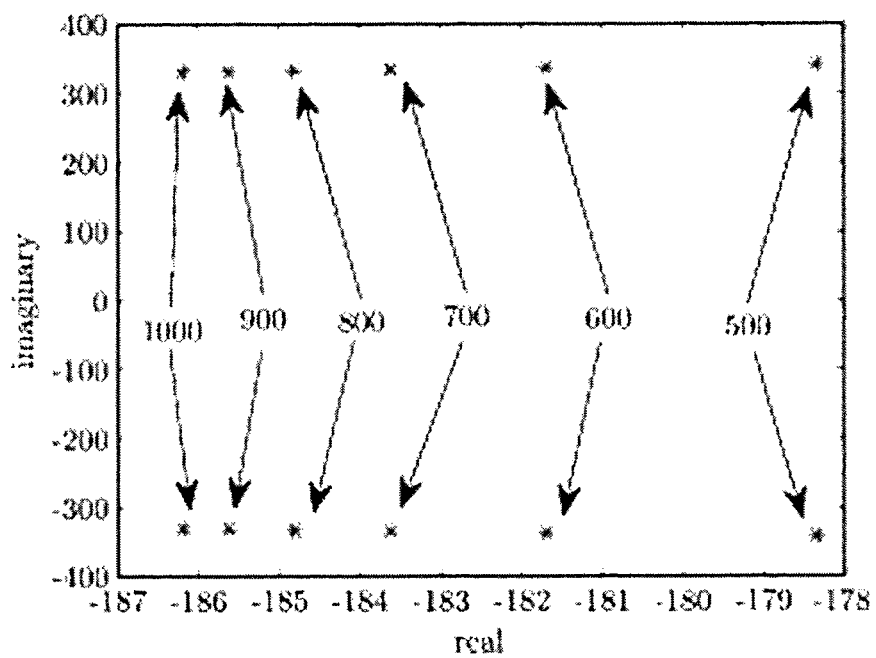
Figure 26:
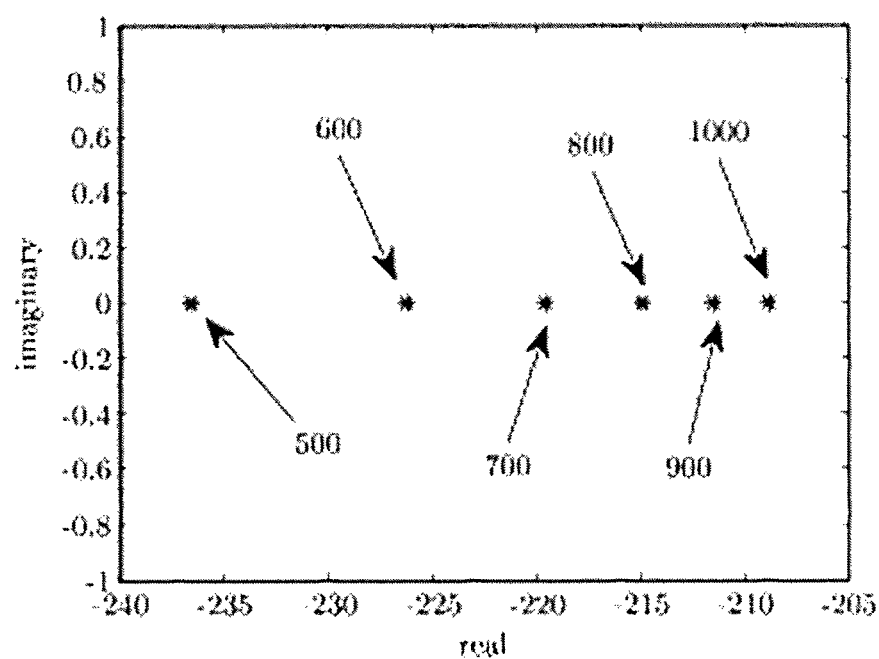
Figure 27:
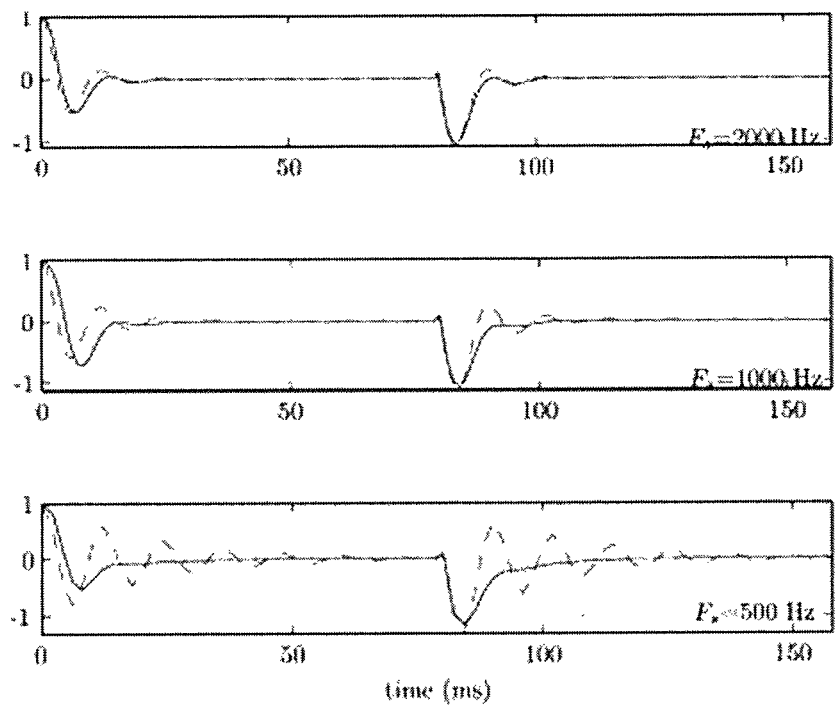
Figure 28:
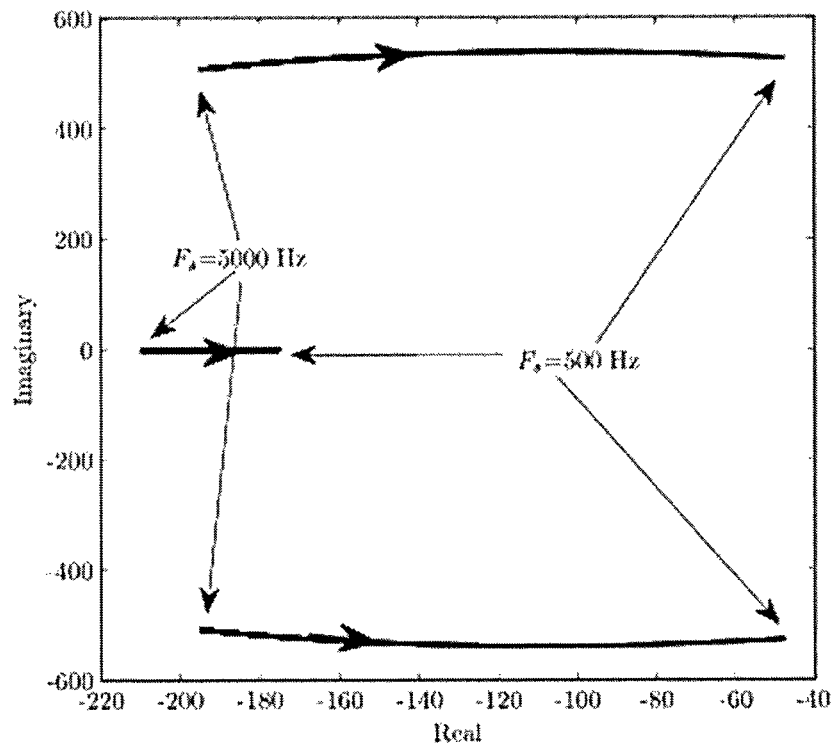
Figure 29:
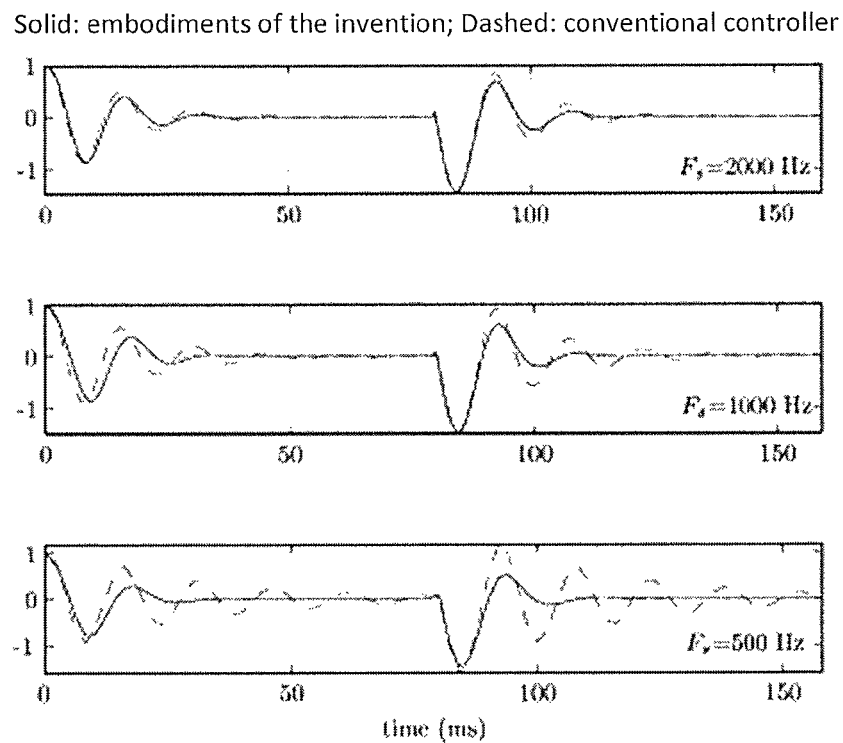
Figure 30:
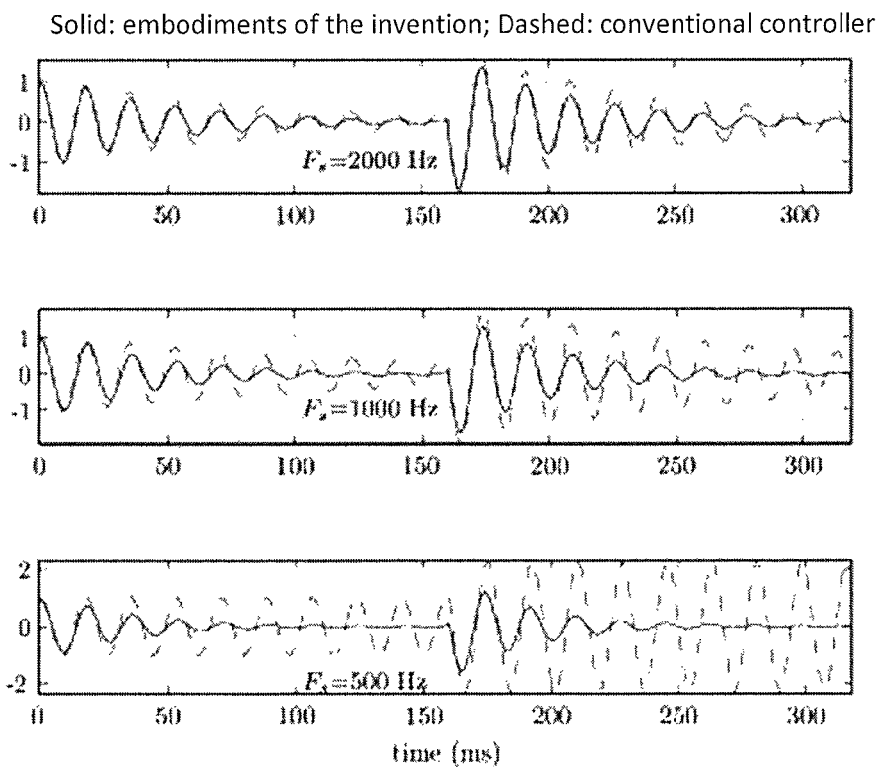
Figure 31:
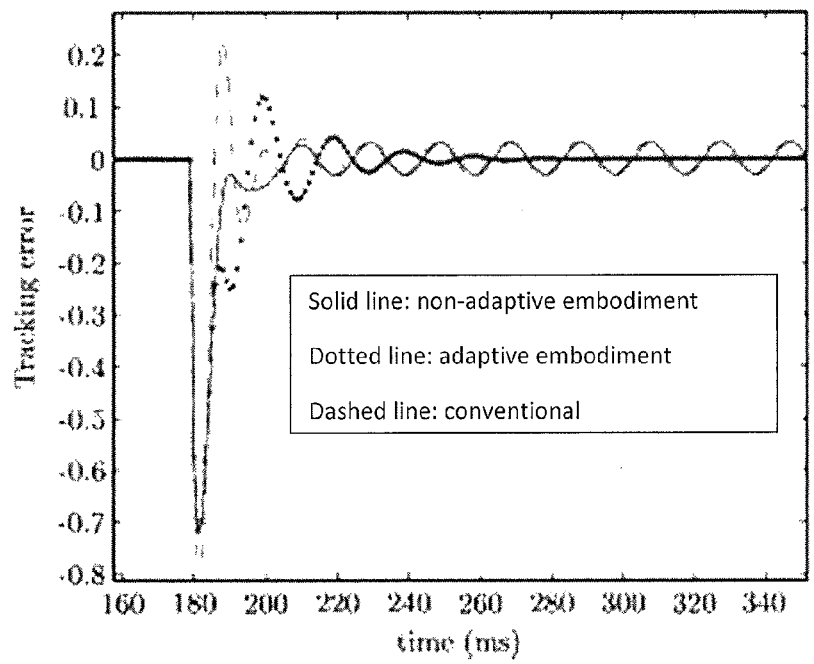
Figure 32:
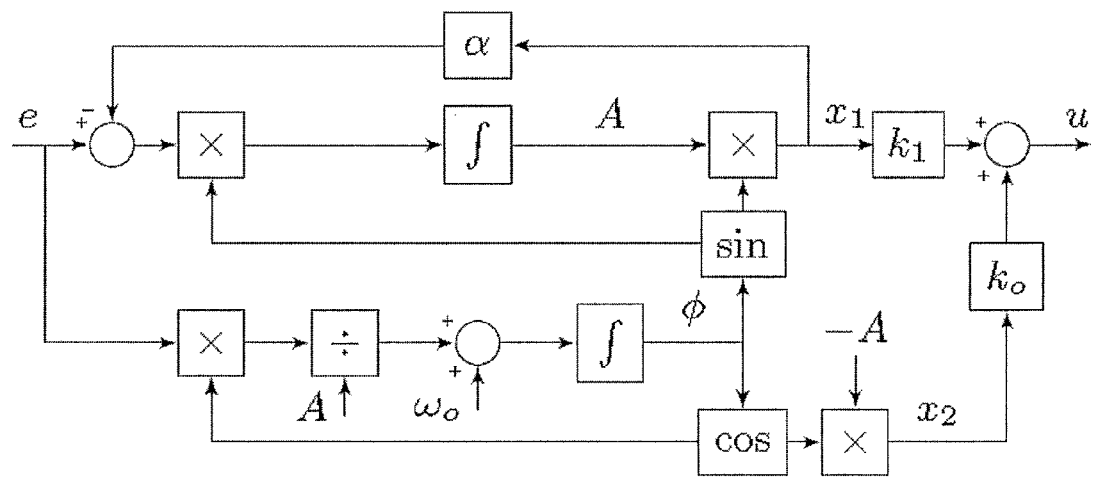

$2^{-y} = [\mu T]_2$;

FIG. 14 is a plot of the parameters $b = \cos \omega_o T$, $$c = 2\frac{1 - \cos\omega_o T}{\Delta}$$

and $d = \omega_o T$ for a resonant controller according to one embodiment;

FIG. 15 upper panel: a plot showing responses of the closed-loop system of FIG. 1 when the controller is implemented using $\delta$-domain function and using a PFR controller in a fixed-point environment, wherein the sampling frequency is 40 kHz and the input signal is digitized at 10 bits; lower panel: a zoomed portion of the upper panel;

FIG. 16 upper panel: a plot showing responses of the closed-loop system of FIG. 1 when the controller is implemented using $\delta$-domain function and using a PFR controller in a fixed-point environment, wherein the sampling frequency is 40 kHz, but the sampling frequency increases to 60 kHz and 80 kHz, and the input signal is digitized at 10 bits; lower panel: a zoomed portion of the upper panel;

FIG. 17 is a block diagram of a frequency-adaptive PFR controller according to one embodiment;

FIG. 18 is a plot showing tracking error for large frequency jumps with and without the frequency adaptive loop, based on the embodiment of FIG. 17;

FIG. 19 is a schematic diagram of an embodiment as used with an uninterruptable power supply (UPS) power circuit, for an experimental setup;

FIG. 20 is a screen shot of experimental results for the circuit of FIG. 19 using a conventional resonant controller, showing a startup transient of the UPS output current and voltage;

FIG. 21 is a screen shot of experimental results for the circuit of FIG. 19 using a conventional resonant controller, showing the UPS output current and voltage for a load change;

FIG. 22 is a screen shot of experimental results for the circuit of FIG. 19 using a PFR controller according to one embodiment, showing a startup transient of the UPS output current and voltage;

FIG. 23 is a screen shot of experimental results for the circuit of FIG. 19 using a conventional resonant controller according to one embodiment, showing the UPS output current and voltage for a load change;

FIG. 24 is a schematic diagram of an embodiment wherein a PFR controller in a control loop regulates the output current of a grid-connected inverter with an LCL output filter;

FIG. 25 is a plot showing locations of the poles of a closed-loop system of for five different values of sampling frequency ranging uniformly from 500 Hz to 1000 Hz;

FIG. 26 is a plot showing locations of the poles of an averaged linearized version of a closed-loop system for five different values of sampling frequency ranging uniformly from 500 Hz to 1000 Hz;

FIG. 27 is a plot showing performance of a low sampling frequency resonant controller embodiment of FIG. 12 and of a conventional resonant controller for a first-order plant at three sampling frequencies;

FIG. 28 is a plot showing locations of the closed-loop poles of a digital system (first-order plant) with a conventional R controller when the sampling period increases from 0.2 ms to 2 ms;

FIG. 29 is a plot showing performance of a low sampling frequency resonant controller embodiment of FIG. 12 and of a conventional resonant controller for a second-order plant at three sampling frequencies;

FIG. 30 is a plot showing performance of a low sampling frequency resonant controller embodiment of FIG. 12 and of a conventional resonant controller for a third-order plant at three sampling frequencies;

FIG. 31 is a plot showing performance of adaptive and non-adaptive low sampling frequency resonant controller embodiments and of a conventional resonant controller for a first-order plant when the input signal frequency experiences a 1 Hz jump, wherein the sampling frequency is at 1 kHz; and FIG. 32 is a block diagram of a resonant controller generalized to a second-order transfer function, according to one embodiment.

DETAILED DESCRIPTION OF EMBODIMENTS

Provided herein are digital controllers and digital control methods for use in tracking of sinusoidal commands and/or rejection of sinusoidal disturbances in many applications, including, for example, ac power system applications. Such systems may include single-phase systems. Examples include, but are not limited to, grid-connected inverters, such as distributed generation (DG) systems (e.g., photovoltaic, wind turbine, etc.) as well as rectifiers, grid-isolated inverters, such as uninterruptible power supply (UPS) systems as well as off-grid DG systems, permanent magnet synchronous motor drives, custom power controllers such as active power filters, and flexible ac transmission systems.

In various embodiments, the controller may be implemented in whole or in part using discrete components, using digital technology (e.g., in a digital signal processor (DSP), field programmable gate array (FPGA), or application specific integrated circuit (ASIC) device), or using a combination thereof. For example, one or more components of the controller may be implemented in an algorithm using a suitable hardware language such as, for example, very high speed integrated circuit (VHSIC) hardware descriptive language (VHDL), register transfer language (RTL), or Verilog. Such an algorithm may be implemented in, for example, a FPGA or ASIC device, or other suitable logic device.

A digital controller as described herein overcomes the aforementioned drawbacks and limitations of prior digital controllers. This is achieved by employing novel approaches to the design of a digital controller. For example, rather than using the conventional s-domain representation of a transfer function, embodiments described herein use a representation that involves trigonometric functions. Such functions may be realized in platforms such as, but not limited to, DSP and FPGA chips. Among controllers, the resonant (R) controller is the most challenging member (or building block) of all such controllers, as far as digital realization is concerned. Therefore, embodiments are described herein primarily with respect to resonant controllers, and they are extended to general second-order controllers. However, any high-order controller may be broken down to a combination of first-order and second-order controllers. Embodiments described herein are applicable to all linear controllers of any order equal to two or higher than two.

In certain embodiments an R controller as described herein may not require a high number of bits (NB) for applications with high sampling frequency. Embodiments may be derived by transforming the R controller equations to polar coordinates, and may be referred to herein as polar form resonant (PFR) controllers. The PFR equations may involve calculation of trigonometric functions similar to phase-locked loop (PLL) systems, such as, for example, an enhanced PLL (EPLL). The PFR is input-output equivalent to the R controller but the dynamics of its state variable are nonlinear. Therefore, it has different properties when implemented on a digital platform. Embodiments described herein may include properties of the PFR controller for applications which require either a fixed-point implementation at high sampling frequencies or a general digital implementation at low sampling frequencies. A low sampling frequency may be, for example, a sampling frequency at 100 times the resonant (or center) frequency, or lower. A high sampling frequency may be, for example, a sampling frequency at more than 100 times the resonant (or center) frequency. Embodiments provided herein are robust at low and high sampling frequencies, and provide superior performance relative to prior resonant controllers.

In one embodiment, a PFR controller as described herein provides a robust structure for fixed-point implementations at high sampling frequency. However, contrary to the $\delta$ operator, it does not require new design parameters. The PFR does not suffer from the truncation error of the $\delta$ operator. Such errors can lead to undesirable lack of resolution and even limit cycles in the $\delta$ operator. Moreover, the PFR conveniently offers extension to cases where the system frequency is not constant. Such an extension is made without requiring adaptive adjustment of controller's parameters and this signifies another advantage of the PFR controller over the $\delta$ operator.

Analog Representation of a Resonant Controller

A resonant (R) controller may be expressed by the following transfer function:

$$G_R(s) = \frac{\mu s}{s^2 + \omega_o^2} \qquad (1)$$

where $\omega_o$ is the center frequency and $\mu$ is the controller gain. When placed in a feedback loop and provided that the closed-loop system is asymptotically stable, the loop ensures zero steady-state error to command signals that are single sinusoid at the center frequency $\omega o$ (see FIG. 1). Moreover, plant disturbances that are sinusoidal at the center frequency $\omega_o$ are completely rejected.

Figure 2:
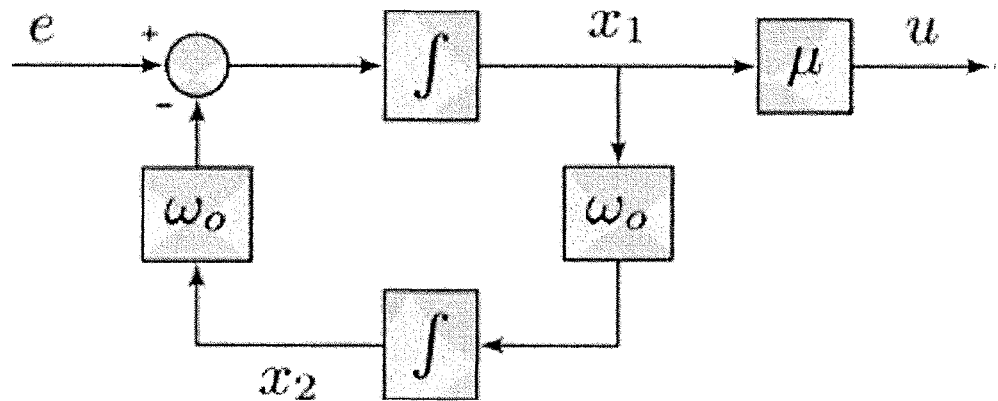
FIG. 2 is a block diagram of a resonant controller based on a state-space representation.

A state-space representation of this controller is given by $$\dot{x}_1 = -\omega_o x_2 + e$$

$$\dot{x}_2 = \omega_o x_1$$

$$u = \mu x_1 \qquad (2)$$

and is shown in block diagram form in FIG. 2.

Digital Realization of a Resonant Controller

Discretization of an R controller may be done in various ways such as forward, backward, Tustin, zero-order hold (ZOH), zero pole matching, and their combinations. Such different methods result in different transfer functions which approximate the analog transfer function of the R controller at different accuracies. The Tustin (or trapezoidal) method with frequency warping at $\omega_o$ results in an accurate transfer function, and may be used for discretization of an R controller and comparisons with a controller as described herein.

Figure 3:
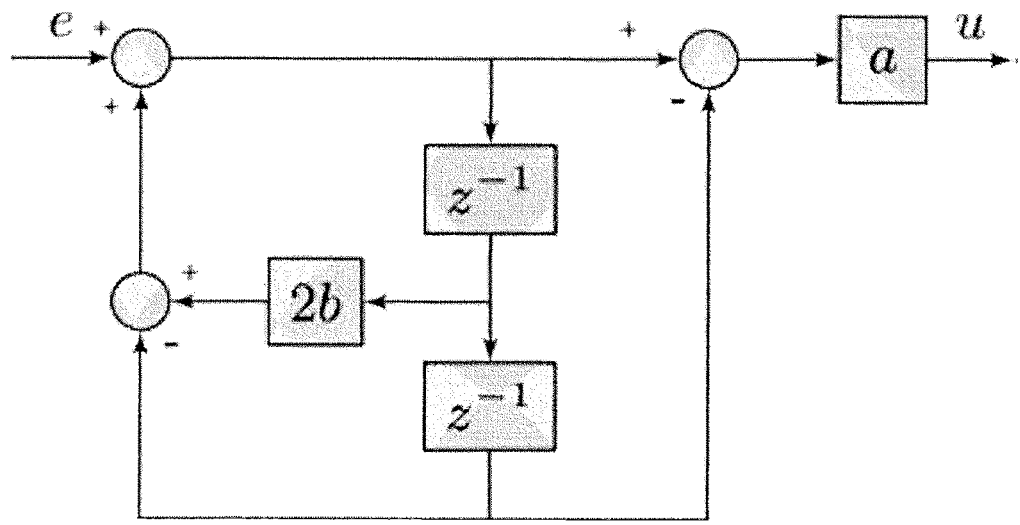
FIG. 3 is a block diagram of a digital resonant controller implemented in direct-form II (DF-II), where $a = \sin(\omega_o T)/2\omega_o$, and $b = \cos(\omega_o T)$, using the Tustin method with frequency prewarping.

The Tustin with frequency warping method is obtained by transformation $$s = \frac{\omega_o}{\tan\left(\frac{\omega_0 T}{2}\right)} \frac{z-1}{z+1}$$

where T is the sampling period. The discrete time transfer function is equal to $$\tilde{G}_R(z) = a\frac{z^2 - 1}{z^2 - 2bz + 1}, \qquad (3)$$

where $$a = \frac{\sin(\omega_o T)}{2\omega_o}$$

and $b=\cos(\omega_o T)$. Realization of this digital filter in direct-form II (DF-II) is shown in FIG. 3.

Figure 4:
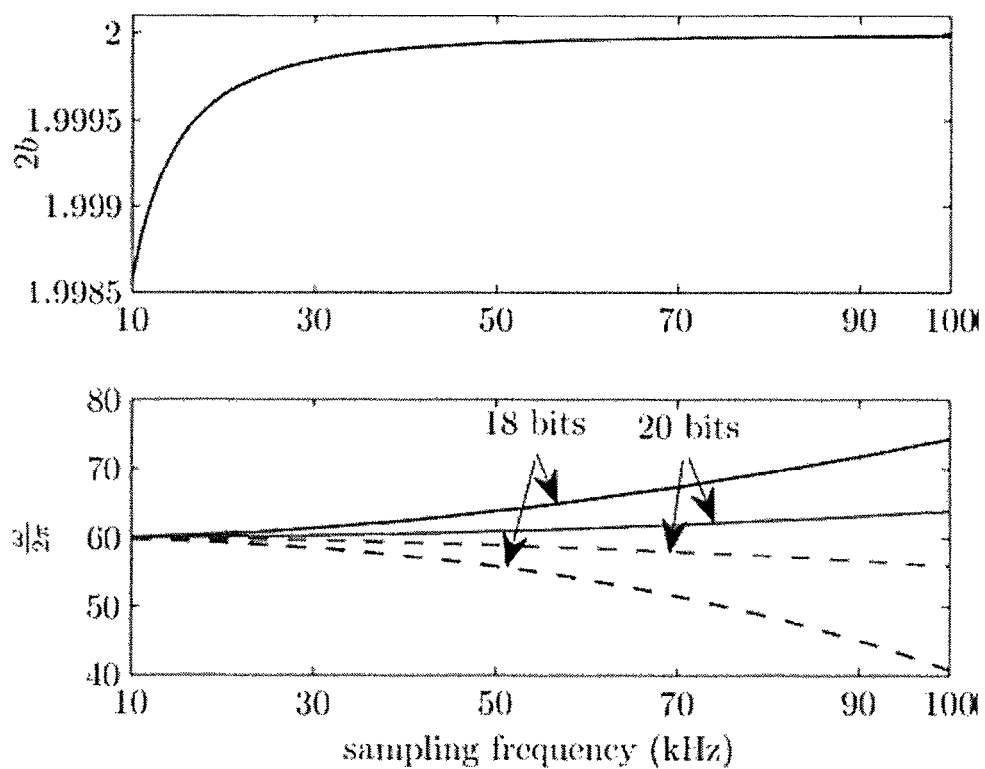
FIG. 4 is a plot showing sensitivity of resonant controller parameters to sampling frequency: upper panel, parameter 2b; lower panel, deviation in the center frequency for two cases where NB=18 and 20.

Sensitivity of R Controllers for Fixed-Point Implementations at High Sampling Frequency The resonant controller has two poles at $z_\pm = e^{\pm j\omega_o T_s}$. The poles are located on the unit circle and they become close to $z=1$ when the sampling frequency is high. The parameter $b=\cos(\omega_o T)$ is close to unity and its accurate realization requires large NB. FIG. 4 (top) shows how fast 2b approaches 2 as the sampling frequency increases to 100 kHz. FIG. 4 (bottom) shows that with a bit length of 18 in implementing this parameter, the incurred error in the location of poles can translate into an error up to ±20 Hz (for a sampling frequency of 100 kHz). This reduces to about ±5 Hz for NB equal to 20. In other words, the controller cannot function accurately even at such high NB.

Figure 5:
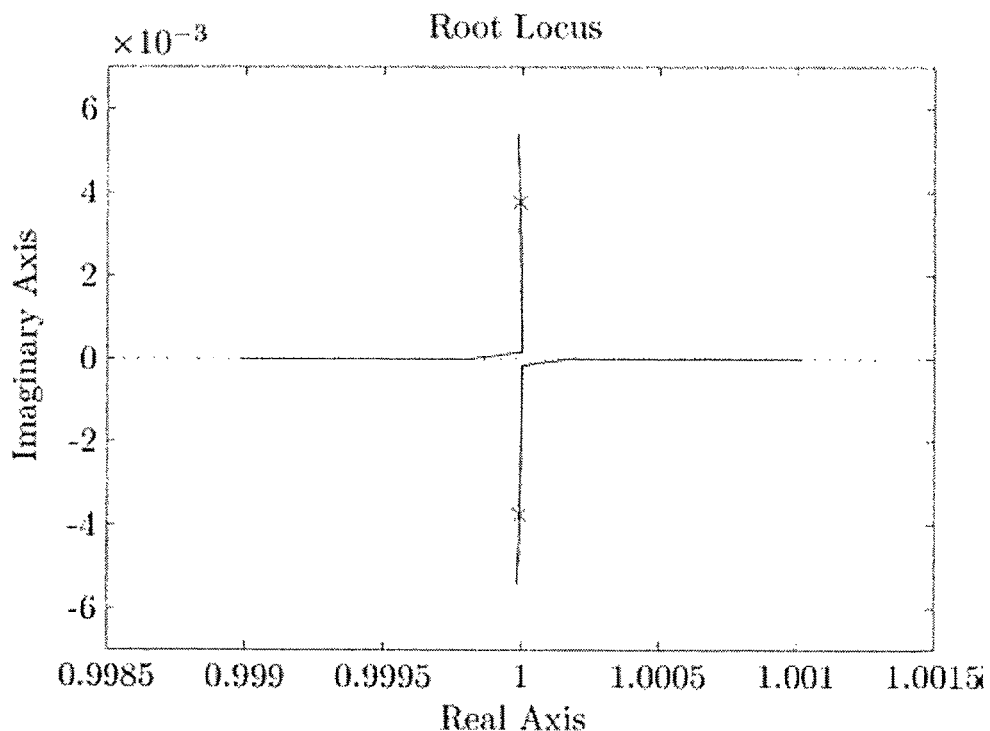
FIG. 5 is a plot showing possible locations of the poles of a resonant controller when the sampling frequency is 100 kHz and the NB for 2b varies from 24 to 16.

The poles are not necessarily located at $z_\pm = e^{\pm j\omega_o T_s}$ when the quantization exists and they vary with the level of the quantization error. Assuming that the NB to realize 2b changes from 24 to 16, then the locus of poles will have a trace as shown in FIG. 5, which shows that the loop cannot maintain internal stability for lower values of word length. Note that here only the error caused by quantization of the parameter 2b is discussed and, in practice, errors caused by bit limitation in other operations may further degrade the situation.

Figure 6:
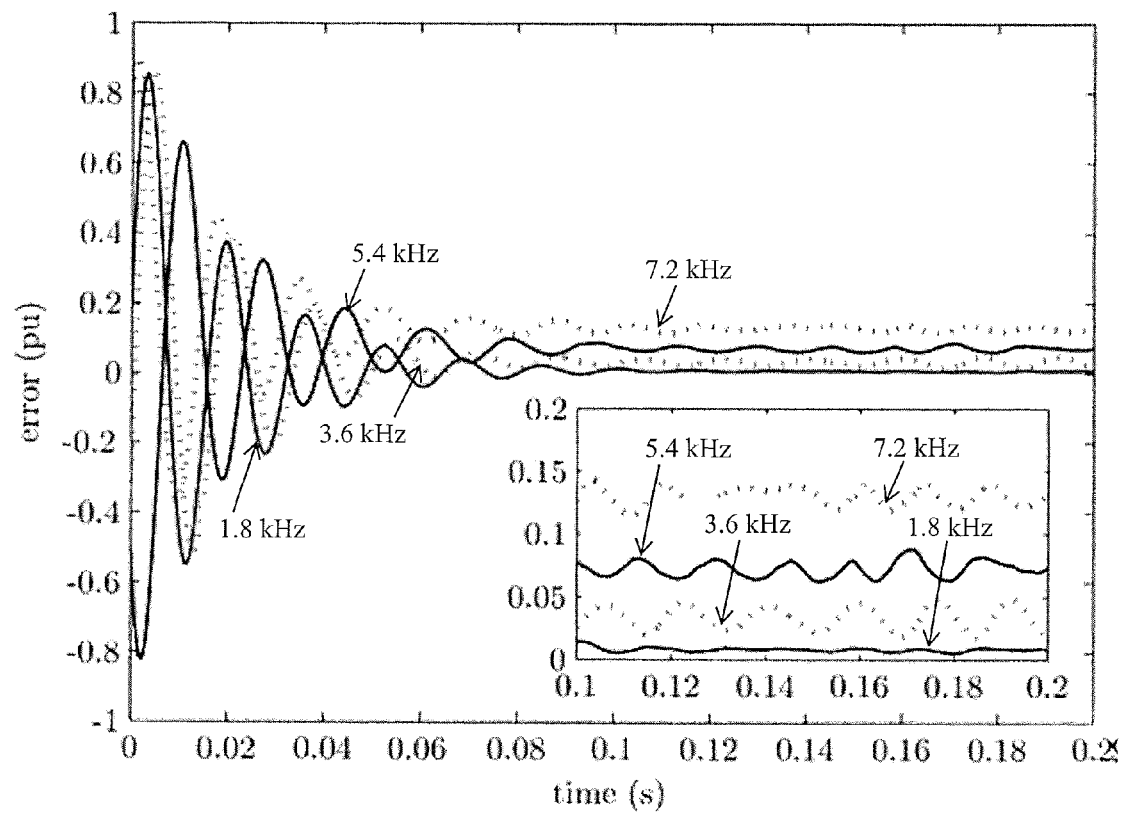
FIG. 6 is a plot showing tracking error for different values of sampling frequency for a conventional R controller in z domain, NB=16.

Simulations show that with limited NB (for instance, 16) for parameters and other arithmetic operations, a resonant controller cannot be implemented for high sampling frequencies (for example, 5 kHz and up). FIG. 6 shows the tracking error of a bandpass filter (obtained by closing the R controller loop with unit gain), implemented in z-domain with 16 bits for sampling frequencies of 1.8, 3.6, 5.4, and 7.2 kHz. A fast increasing error is observed.

δ-Domain Realization

Figure 7:
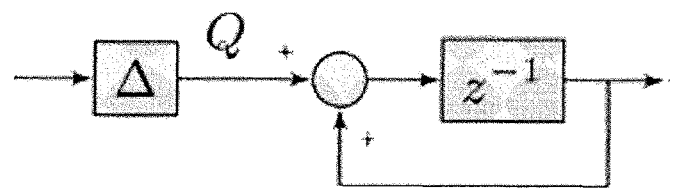
FIG. 7 is a block diagram showing implementation of the parameter $\delta-1$ using $z^{-1}$.
Figure 8:
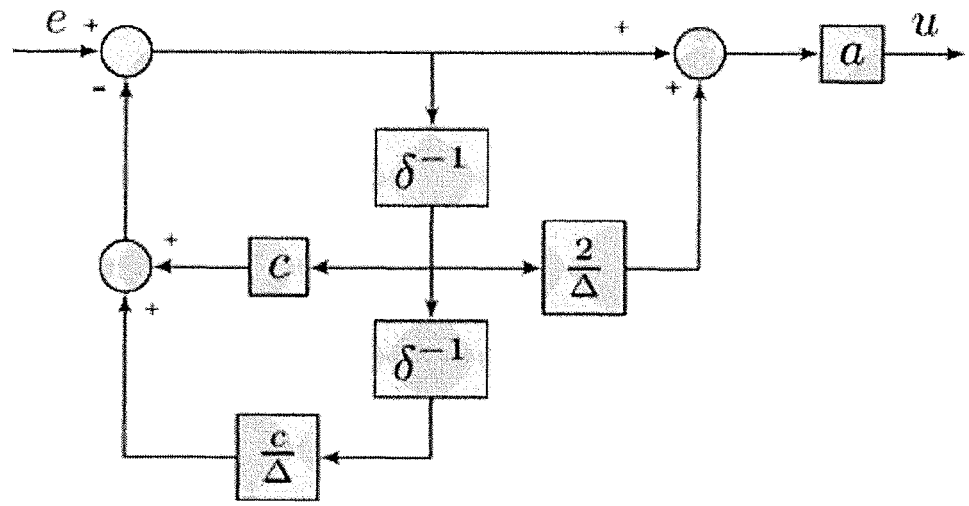
FIG. 8 is a block diagram showing discrete-time implementation of a resonant controller in $\delta$ domain using DF-II.

As discussed above, z domain realization of a resonant controller, even with an accurate discretization method such as Tustin with prewarping, will not work for high sampling frequencies in the presence of NB limitations. One way of overcoming the sensitivity of the R controller for the fixed point limitations is to use a δ operator defined as $$\delta = \frac{z-1}{\Delta}$$

where $\Delta$ is a small positive number. The δ operator is not a discretization method, but it is a transformation that is applicable to any discrete time transfer function in order to make it robust for fixed-point implementations at high sampling frequencies. This operator maps (and enlarges) the region around $z=1$ to $\delta=0$, and thus, the sensitivity problem is alleviated. Using this map, $\tilde{G}_R(z)$ of (3) is mapped to $$\hat{G}(\delta) = a\frac{\delta^2 + \frac{2}{\Delta}\delta}{\delta^2 + c\delta + \frac{c}{\Delta}} \qquad (4)$$

where $$a = \frac{\sin(\omega_o T)}{2\omega_o}, \quad c = 2\frac{1-b}{\Delta},$$

and $b=\cos(\omega_o T)$. Realization of $\delta^{-1}$ using $z^{-1}$ is shown in FIG. 7 and a realization of (4) using DF-II is shown in FIG. 8. Such a realization can be made robust to the bit length limitation effects at high sampling frequencies by a careful selection of $\Delta$.

For example, the parameter $\Delta$ may be selected as $2^P$ for easy fixed-point arithmetics. Selecting the parameter $\Delta$ (or p) is not straight-forward and is obtained through a tradeoff. On one hand, reducing $\Delta$ increases $c=2(1-b)/\Delta$. Thus, the parameter c can be enlarged using $\Delta$, which results in a smaller NB required to realize this parameter. On the other hand, reducing $\Delta$ increases the truncation (or roundoff) error of the δ operation; that is, the error in point Q shown in FIG. 7. For further clarification, a numerical example is provided: Assuming $\mu=10$ and $T=(1/40000)$s, then $b=\cos\omega_o T=0.9999556$. This gives an accuracy of ±0.1 Hz in the center frequency of the resonant controller. At least 24 bits are needed to realize this parameter. Using the δ transformation, the parameter $c=2(1-b)/\Delta=0.0000888/\Delta$. For a value of $\Delta=2^{-5}$, c=0.0028416. If the parameter c is chosen as 0.00284, the same accuracy of ±0.1 Hz in the center frequency will be obtained. To realize this value of c, only 16 bits are required.

Figure 9:
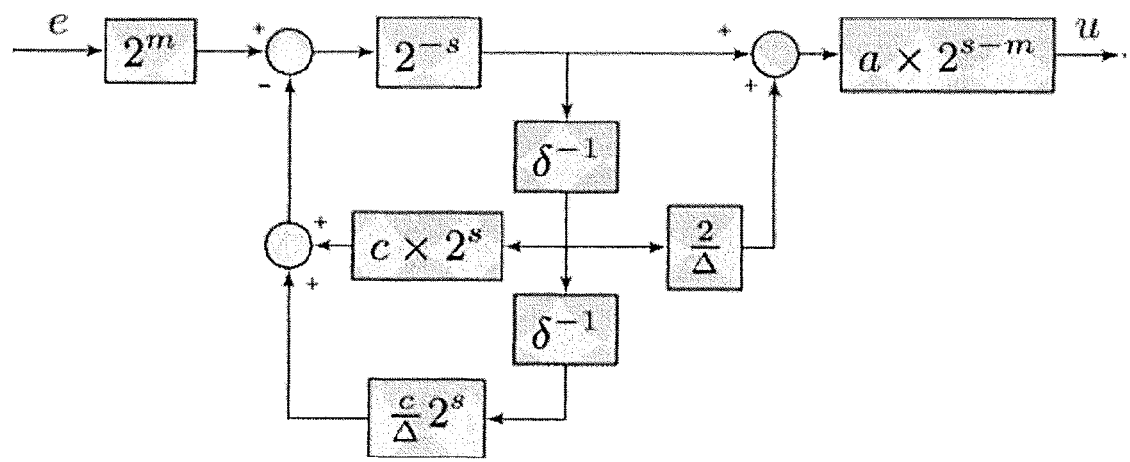
FIG. 9 is a block diagram showing discrete-time implementation of a resonant controller in $\delta$ domain using scaling factors.

In practice, for fixed-point realization, the constant parameters must be properly scaled and enlarged in order to become integers with acceptable accuracy. In the realization of FIG. 8, all the constant parameters may be scaled up $2^s$ times. Then, a $2^{-s}$ block will be required to compensate. Moreover, the input signal may also be scaled by a $2^m$ factor at the input and then compensated at the output. The resultant diagram is shown in FIG. 9. The scaling factors s and m as well as the δ parameter p must be selected in order to bring all parameters and signals within reasonable ranges which can be implemented with minimum NB.

Figure 10:
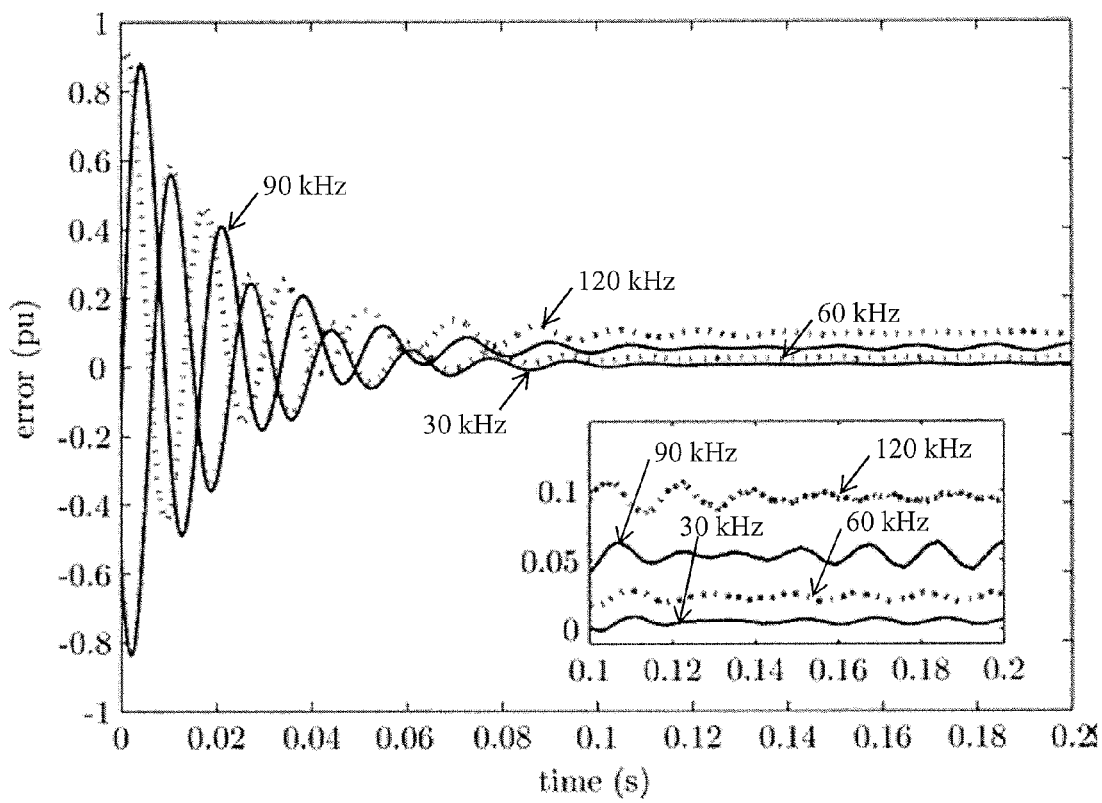
FIG. 10 is a plot showing tracking error for different values of sampling frequency for a $\delta$-domain R controller with NB=16.

A simplified simulation was performed to show the extent of tracking error at high sampling frequencies (30, 60, 90, and 120 kHz) for the realization of FIG. 8, and the results are shown in FIG. 10. In this simulation, $\Delta=\frac{1}{32}$ and NB=16 were selected. A small bias error was observed which increased as the sampling frequency increased. The parameter Δ had significant impact on the responses, and accordingly it must be properly designed based on sampling frequency and bit length requirements.

1. Resonant Controller with Digital Robustness for Fixed-Point Realization at High Sampling Frequency 1.1 Analog Representation The following set of differential equations represents a resonant controller as described herein:

$$\dot{A} = e\sin\phi \qquad (5)$$
$$\dot{\phi} = \omega_o + \frac{e}{A}\cos\phi$$
$$u = \mu A\sin\phi.$$

In (5), A and φ are the state variables of the system, e is the input, U is the output, and μ and $\omega_o$ are positive real constants. The following theorem indicates that the system of (5) is indeed a resonant controller as far as the input-output relationship of the system is concerned.

Theorem 1: The set of differential equations (5) represents a linear time-invariant (LTI) system from its input signal e to its output signal u. Moreover, this system is equivalent to the resonant controller of (2) from the standpoint of input-output transfer function.

Proof: Consider the conventional R controller equations given in (2) and define the following state transformation:

$$\begin{pmatrix} A \\ \phi \end{pmatrix} = \begin{pmatrix} \sqrt{x_1^2 + x_2^2} \\ -\arctan\left(\frac{x_1}{x_2}\right) \end{pmatrix}. \qquad (6)$$

Therefore, $$x_1 = A\sin\phi, \; x_2 = -A\cos\phi, \; \frac{x_1}{\sqrt{x_1^2+x_2^2}} = \sin\phi, \; \frac{x_2}{\sqrt{x_1^2+x_2^2}} = -\cos\phi.$$

The equation for $\dot{A}$ can now be derived from (2) as follows:

$$\dot{A} = \frac{x_1\dot{x}_1 + x_2\dot{x}_2}{\sqrt{x_1^2 + x_2^2}} \qquad (7)$$
$$= \frac{x_1(-\omega_o x_2 + e) + x_2(\omega_o x_1)}{\sqrt{x_1^2 + x_2^2}}$$
$$= \frac{x_1 e}{\sqrt{x_1^2 + x_2^2}}$$
$$= e\sin\phi.$$

Similarly, the equation for $\dot{\phi}$ can be derived as follows:

$$\dot{\phi} = \frac{\frac{x_1\dot{x}_2 - x_2\dot{x}_1}{x_2^2}}{1 + \left(\frac{x_1}{x_2}\right)^2} \qquad (8)$$
$$= \frac{x_1\dot{x}_2 - x_2\dot{x}_1}{x_1^2 + x_2^2}$$
$$= \frac{x_1(\omega_o x_1) - x_2(-\omega_o x_2 + e)}{x_1^2 + x_2^2}$$
$$= \frac{\omega_o A^2 - x_2 e}{A^2}$$
$$= \omega_o + \frac{e}{A}\cos\phi.$$

Moreover, the output signal in (2) is given by $u=\mu x_1$, which is equal to μA sin φ in (5). The aforementioned analysis concludes that both system representations of (2) and (5) are input-output equivalent. Therefore, system (5) represents an LTI system from the standpoint of input-output relationship. However, such a linearity is not valid for the state equations in (5). In other words, (5) is internally nonlinear and externally linear while the conventional resonant controller is totally linear.

Figure 11:
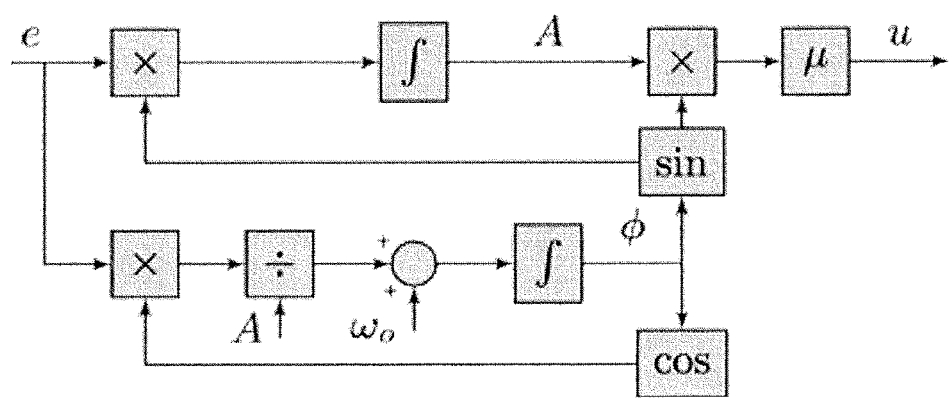
FIG. 11 is a block diagram of a resonant controller according to one embodiment.

The block diagram representation of (5) is shown in FIG. 11. The following points are observed from this diagram and from the results of Theorem 1.

1) The transformation (6) provides the Cartesian to polar transformation, represented in R controller embodiments described herein. Such embodiments may be referred to as polar form resonant (PFR) controllers.

2) Theorem 1 states that both equation sets of (2) and (5) are input-output equivalent and can be used interchangeably. Although such an interchange does not make any difference in ideal situations, it does not mean that both controllers offer identical properties in practical (non-ideal) situations. Examples of such practical situations include digital realization of controllers and inaccuracies that are caused by sampling and also by quantization.

3) The trigonometric calculations in FIG. 11 signify that the system is of a PLL nature.

4) If the outer loop in FIG. 11 becomes closed with unity gain, i.e., e=r−u where r is the input signal in FIG. 1, (and again ignoring the division operation), the system may be equivalent to an EPLL when the frequency estimation law is disabled and amplitude and phase angle estimation gains are set to μ.

5) Multiple resonant controllers are conventionally used to selectively eliminate the harmonics of the fundamental frequency in the control loop. The same concept is applicable to the proposed controller.

1.2 Floating-Point Digital PFR Controller

Different discrete-time versions can be developed for the PFR controller. Here, however, each integrator needs to be discretized individually because the two differential equations cannot be combined. Three methods that may be used to obtain discrete-time version of an integrator are the forward, backward, and Tustin methods. These are characterized by the following transfer functions:

$$\frac{Tz^{-1}}{1-z^{-1}}, \frac{T}{1-z^{-1}}$$

and $$\frac{T}{2}\frac{1+z^{-1}}{1-z^{-1}}.$$

The latter may be prewarped. In the block diagram of FIG. 11, the lower integrator can only be digitized using the forward method; otherwise, it will make an algebraic loop. Having chosen the forward method for the lower integrator, the other integrator can safely be chosen as any of the earlier options without causing algebraic loop. The Tustin method is more complex to realize compared with the forward and backward methods. Moreover, in order to minimize the effect of computational delay within the control loop, the forward method is also preferred for the second integrator. This is because the forward method does not make use of the current sample of the input signal when processing its output signal.

The discrete-time version of equation set (5) using forward method for both integrators is given as $$A[n] = A[n-1] + Te[n-1]\sin(\phi[n-1]) \quad (9)$$
$$\phi[n] = \phi[n-1] + \omega_0 T + T\frac{e[n-1]}{A[n-1]}\cos(\phi[n-1])$$
$$u[n] = \mu A[n-1]\sin(\phi[n-1]).$$

The discrete-time equations (9) may be improved by replacing $e[n-1]$ by $e[n]$. Moreover, the term $A[n-1]$ in the second equation may be replaced with $A[n]$. These replacements correspond to an intermediate point between the forward and backward methods. The resultant equations are described as $$A[n] = A[n-1] + Te[n]\sin(\phi[n-1]) \quad (10)$$
$$\phi[n] = \phi[n-1] + \omega_0 T + T\frac{e[n]}{A[n]}\cos(\phi[n-1])$$
$$u[n] = \mu A[n-1]\sin(\phi[n-1]),$$

and are represented in the block diagram shown in FIG. 12.

1.3 Fixed-Point Digital PFR Controller

Figure 13:
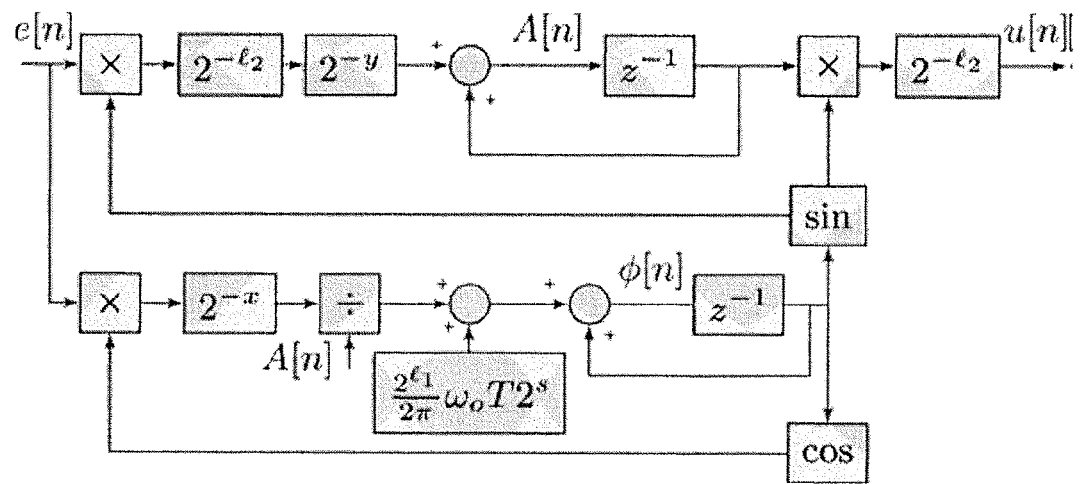
FIG. 13 is a block diagram of a fixed-point digital implementation of a PFR controller according to an embodiment wherein sine and cosine look-up tables have $l_1$ bits (unsigned) at the input and $l_2+1$ bits (signed) at the output, $$2^{-x}\left[\frac{2^{l_1}}{2\pi}\mu T 2^{s-l_2}\right]_2,$$

In one embodiment the sine and cosine functions may be realized using look-up tables. This approach allows significant simplification in calculations because of the symmetry that exists in sine and cosine functions. Having only sine function data over a quarter of cycle is adequate to have those two functions over the entire cycle of the signal. Assume, for example, that $l_1$ is the number of bits at the input of the look-up table and $l_2$ is the number of bits at the output. The size of the look-up table may be selected as low as $2^{l_1-2}$. A fixed-point implementation of the PFR controller is shown in FIG. 13. In this figure, the main critical parameter is equal to $$\frac{2^{l_1}}{2\pi}\omega_0 T 2^s$$

where s is a scaling factor to make the number large enough to have adequate accuracy for representing the center frequency. The other gains are located in the forward paths and they can be rounded to the closest power of two numbers in order to reduce the multiplications to simple shift operations. These are denoted by $$2^{-x} = \left[\frac{2^{l_1}}{2\pi}\mu T 2^{s-l_2}\right]_2,$$

$2^{-y}=[\mu T]_2$ in FIG. 13. The notation $[\cdot]_2$ is used to show approximation by the closest power of two number. This approximation translates into a slight change in the controller gain and does not compromise the performance of the control loop.

1.4 Structural Robustness of the PFR Controller

The root cause of sensitivity of the z-domain R controller is the parameter $b=\cos \omega_o T$ that becomes close to unity when the sampling frequency is high. The $\delta$ transformation mitigates this problem by transforming b to $$c = 2\frac{1-b}{\Delta}.$$

Proper selection of $\Delta$ makes this parameter suitable for realization with lower NB. In a PFR controller, a critical parameter is $d=\omega_o T$, as it is observed by the diagram of FIG. 12 and the digital equation set of (9). This parameter translates to $$\frac{2^{l_1}}{2\pi}\omega_0 T 2^s$$

when the scaling factor and the LUT effect are considered, as shown in FIG. 13. This is because this parameter directly determines the central frequency of the PFR controller. The other parameters that appear in the direct path of the closed loop do not cause sensitivity problems.

A comparison between the robustness of a PFR controller as described herein and a $\delta$-domain R controller may be made by considering the three critical parameters of $b=\cos \omega_o T$, $$c = 2\frac{1-\cos\omega_o T}{\Delta}$$

and $d=\omega_o T$. Graphs of these three parameters versus $\omega_o T$ are shown in FIG. 14. Flatness of each graph causes the problem of sensitivity with respect to word length limitation. This is because for a given NB, a flatter curve creates a larger deviation in the center frequency for the same amount of error in the realization of the critical parameter. For a value of 40 kHz sampling frequency, $\omega_o T$ is about 0.01. It is clearly observed from FIG. 14 (the zoomed portion) that the critical parameter of the PFR controller is sharper than the $\delta$-domain R controller (with $\Delta=2^{-6}$) at or around $\omega_o T=0.01$.

$$G(s) = \frac{100}{s+1000}$$

Further simulations considered the first-order plant for which the resonant controller with gain of μ=4000 was designed. The objective was to implement a resonant controller at a high sampling frequency of $F_s$=40 kHz within a limited word-length framework using fixed-point. Simulations were performed in MATLAB/Simulink. Effects of quantization on the parameters, the summations, and the multiplications were considered using quantization block in Simulink. The only effect that is not modeled by this type of simulation is the possible saturation of the results at the calculation points. Such an effect is not necessary to be modeled because such a saturation is not expected to happen in a practical design. All such effects are covered in the FPGA design below. In the simulations, the input signal was digitized using 8 bits. For the R controller, $\Delta=2^{-6}$ was selected. The PFR controller was also implemented using the structure in FIG. 13. The sine and cosine functions were realized using LUTs with 64 entries (expanding over quarter of a cycle), that is $l_1$=6. The output of the sine/cosine look-up tables has $l_2$=8 bits. The division operation was implemented using a LUT with 32 entries.

Performances of both systems (the PFR and the δ-operator) are shown in FIG. 15 for an input signal which experiences an amplitude change at t=0.04 s and a phase angle jump at t=0.1 s. The initial phase angle of the input was set randomly. The top portion of the figure shows the tracking errors for both systems while the bottom portion shows a zoomed version of the same graph. The floating-point response is also shown for reference. The input signal magnitude was in the order of 29 and the tracking error was in the order of 5, that is, about 1%. Both systems offer desirable responses.

The δ-domain implementation was controlled by the parameter Δ and this parameter must be readjusted for different values of sampling frequency. The PFR controller does not have such a design parameter. It is, however, concluded from FIG. 14 that the critical parameter of the PFR controller is always steeper than that of δ-domain R controller when the sampling frequency is increased (that is, for small $\omega_o T$). Therefore, it is expected that the PFR controller generally has more robust performance than the δ-domain controller when the sampling frequency increases for a given NB. This behavior was confirmed by the simulation study in FIG. 16. In this simulation, the sampling frequency was increased from 40 to 60 kHz and to 80 kHz without changing the NB. The δ-domain R controller failed to cope with this large change of the sampling frequency while the PFR controller continued to operate.

1.5 Frequency-Adaptive PFR Controller

This example provides embodiments for applications where large frequency variations may occur, and the resonant controller has to be frequency adaptive. That is, the center frequency of the resonant controller, $\omega_o$, adjusts to frequency variations. The conventional approach is to use a separate PLL to estimate the frequency and then forward that estimated frequency to the R controller. This method is justified as the rate of change of frequency in power systems is limited. This means that the parameter $$c = 2\frac{1-\cos\omega_o T}{\Delta},$$

in δ-domain realization, must be adjusted according to the changes in $\omega_o$. This can be done using a LUT mechanism.

In contrast, a PFR controller according to the preset embodiment can easily accommodate this requirement when another integrator is added in the loop as shown in FIG. 17. The output of the lower integrator that is added to the nominal value of the center frequency ($\omega_o''$) is an estimate of the frequency deviation. That is, this PFR embodiment obviates the need for a separate PLL to estimate the frequency. Moreover, it does not involve any new gain that is dependent on the estimated frequency, such as the gain c in the δ-domain realization. This results in significant ease of implementation for fixed-point applications.

Performance of the frequency-adaptive PFR method for an extreme condition is shown in FIG. 18. In this simulation, a simple control loop was considered where the PFR was used as the controller. The frequency of the input signal experienced a jump of 5 Hz at t=0.1 s. The tracking errors of the PFR controller and the frequency-adaptive PFR controllers are shown in the graph. It is observed that there will be approximately 10% tracking error when the fixed frequency PFR is used. The frequency-adaptive PFR adjusts to the frequency and the tracking error converges to zero. The output of the frequency integrator is also shown in the bottom of FIG. 18. It can be seen that the frequency is estimated precisely and quickly.

1.6 Examples

Embodiments described herein may be applied to control schemes in a variety of applications. Two exemplary applications are presented here: an uninterruptable power supply (UPS) with an output LC filter, and a grid-connected inverter with an LCL output filter. Other applications may include, but are not limited to, a grid-connected inverter with an L output filter, and grid-connected rectifiers.

1.6.1 Control of Uninterruptable Power Supply

An experimental setup based on a 200 W UPS system was built. The power circuit used a full-bridge inverter fed by a 400 V dc power supply and was connected to the load through an LC filter. The load voltage was desired to be sinusoidal at 60 Hz and with rms value of 220 V. The LC filter parameters were L=2 mH and C=1 μF. A block diagram of the power circuit along with the control system is shown in FIG. 19.

Design of Control

The state-space representation of the system is given by $$\begin{pmatrix} \frac{di_L}{dt} \\ \frac{dv_o}{dt} \end{pmatrix} = \underbrace{\begin{pmatrix} 0 & \frac{-1}{L} \\ \frac{1}{C} & 0 \end{pmatrix}}_{A_p} \underbrace{\begin{pmatrix} i_L \\ v_o \end{pmatrix}}_{x_p} + \underbrace{\begin{pmatrix} \frac{K_{PWM}}{L} \\ 0 \end{pmatrix}}_{B_p} u_i + \begin{pmatrix} 0 \\ \frac{-1}{C} \end{pmatrix} i_o \quad (11)$$

where $i_L$, $v_o$, $i_o$, and $u_i$ are, respectively, the inductor current, the load voltage and current, and the control signal for the inverter. To actively damp the LC resonant frequency at $$\frac{1}{\sqrt{LC}},$$

controller's bandwidth needs to be high enough. However, higher bandwidth allows smaller amount of tolerable delay for a given value of system phase margin. At a good phase margin of PM=60°, for instance, the amount of allowable delay can be approximated from $\omega T_d$=PM which is less than $T_d$=46 µs for the circuit values used. This exceeds the one sample computation delay that exists in a digital system with 40-kHz sampling frequency. To overcome this issue, the computation delay of the digital control should be considered in the design of the digital controller.

The aforementioned state-space equations were first transformed into digital using the ZOH method to achieve $x_p(k)=A_{pd}x_p(k-1)+B_{pd}u_i(k-1)$ where $A_{pd}=e^{A_pT}$ and $$B_{pd} = \int_0^T e^{A_p\tau} d\tau B_p.$$

After including one sample calculation delay in the main loop of the controller, the state-space equations were derived as $$\begin{pmatrix} x_p(k) \\ u_i(k) \end{pmatrix} = \begin{pmatrix} A_{pd} & B_{pd} \\ 0 & 0 \end{pmatrix} \begin{pmatrix} x_p(k-1) \\ u_i(k-1) \end{pmatrix} + \begin{pmatrix} 0 \\ 1 \end{pmatrix} w_i(k-1) \quad (12)$$

This new system has three state variables including the variable associated with the delay. The controller uses a resonant output feedback to ensure tracking of output voltage command and rejection of load current disturbances. The resonant controller in the digital domain is modeled by $$H_R(z) = \frac{k_3 + k_4 z^{-1}}{1 - 2bz^{-1} + z^{-2}}.$$

The plant and the resonant controller state space equations were augmented and they result in a fifth-order system. The LQR technique [3], [4] is a method used for solving regulation problems which can be extended for tracking problems, and was used here to design a full state feedback for the system as shown in FIG. 19.

The following points concern implementation of embodiments of the controller in an FPGA:

1) In digital implementation, the sine and cosine functions may be implemented using a single LUT and there is no need for high resolution. For example, a LUT as small as 7 bits may suffice.

2) In one example for PFR implementation, the following parameters were used: $l_1$=9, $l_2$=8, s=2, and x=y=12. For the R controller, the following parameters were used:

$$\Delta = \frac{1}{32},$$

s=6, and m=14. The controller gain µ=8 was obtained using the method explained previously. The other controller gains were selected as $K_1$=0.49, $K_d$=0.62, and $K_2$=−0.0029.

3) Both controllers were implemented in an FPGA using state machines. The PFR and R controller were implemented using 8 and 11 states, respectively. The clock of the state machine was selected as 6.4 MHz. As a result, the total computation time for PFR and R controllers were 1.25 and 1.72 µs, respectively. The clock may be reduced as long as the total calculations fit in half of a sampling period.

4) For each structure, the NB for internal variables depends on the value of parameters, the input size, and the required accuracy. To avoid saturation and overflow, NB should be selected high enough to make sure that no saturation occurs in transients. For each controller, there are critical variables, whose NB need to be selected and the rest of them can be calculated accordingly. The critical points are normally the output of the integrators. For both structures, the input and outputs are 16 bits. For the PFR controller, the upper integrator requires 29 bits and the lower one requires 22 bits including the sign bits. For the R controller, the output of the upper $\delta^{-1}$ requires 28 bits and the lower one requires 29 bits.

5) With recent development in DSP hardware systems including FPGA and DSPs chips, division can be done easily. However, one or more of the following approximations can optionally be used for the division operation to further reduce the computational burden of the division.

a) Assume that the input signal magnitude is $A_o$ and the plant transfer function is G(s). Then, the variable A will, in the steady state, converge to $$A_\infty = \frac{A_o}{\mu |G(j\omega_o)|}.$$

The division operation can be replaced by a multiplication with $$\frac{1}{A_\infty}.$$

In other words, the expected steady-state value replaces the variable. This may be used in applications where the command signal does not experience extremely large changes in its magnitude, such as in UPS applications.

b) A more accurate replacement for the division operation, that is specially advantageous in fixed-point implementations, is to make the division not exactly equal to the actual variable A, but equal to the power of two number that is closest to the estimated (fixed-point value of) A at any instant of time. The division is then reduced to a shift operation for an appropriate NB.

Digital Hardware

To digitally implement an embodiment of the controller as designed above, a sampling frequency of 40 kHz was selected. This is more than five times the resonant frequency of the output LC or LCL filter that enables implementation of the required high bandwidth controller. The switching frequency of the inverter was selected at 20 kHz synchronized with the sampling frequency. The pulse-width modulation strategy was unipolar which generates an effective double switching frequency.

Both R and PFR controllers were digitized, implemented, and tested using fixed-point calculation in an Altera Stratix II FPGA development board (Altera Corporation, San Jose, Calif.). Since the controller design was based on one sampling delay, the controller calculations were updated once every sampling period (although the calculations are completed much faster than one sampling period). Voltage and current feedback signals were sensed using a voltage divider and Hall effect sensors and converted to digital using a 10-bit serial A/D connected to the FPGA board. The load voltage and current were measured using Lecroy ADP305 high-voltage differential probe and Lecroy cp015 current probe, respectively (LeCroy Corporation, Chestnut Ridge, N.Y.). A Lecroy digital oscilloscope was used to display and save the signals.

Results and Comparison

FPGA resource utilization is a very important factor, particularly when the controller becomes complicated. In grid-connected applications, the control system can become very complicated, since for harmonic cancelation, a series of resonant controllers is used. Both R and PFR controllers may be used to implement resonant controllers, and in this example they were implemented to compare their resource utilizations.

Using Quartus software (Altera Corporation, San Jose, Calif.), which is a programmable logic device design software, and very high speed integrated circuit hardware description language programming, controllers were implemented and compiled. Using fitter resource utilization option in Quartus, the utilization of the main resources for each entity in the compilation hierarchy can be obtained. The main resources include logic cells (LC), number of registers, DSP elements, DSP 18×18, and LUT. LCs are the basic building blocks of FPGAs and usually consist of a four-input LUT, a programmable register, and a carry chain. Moreover, each LC can perform single-bit arithmetic operations such as addition or subtraction. Depending on the FPGA, some device families support DSP elements which are efficiently implemented and ready-to-use hardware for multiplication, multiplication-addition, and multiplication-accumulation functions.

Table I shows the result of the fitter resource utilization report for both R and PFR controllers with 16-bits input. It can be observed that both controllers use a similar number of LCs. However, the R controller uses about two to three times more registers, DSP elements, DSP 18×18, and LUTs. As discussed above, to achieve frequency-adaptive controller for an R controller, an additional block must be used to estimate the frequency and feed it to the controller parameters. Table I shows the resource utilization report for an EPLL with a 10-bit input, which has to be added to the R controller to become a frequency-adaptive system. However, the implementation for PFR includes the frequency-adaptive feature.

TABLE I

| Entity | Logic Cells | Registers | DSP Elements | DSP 18 × 18 | LUT |
|---|---|---|---|---|---|
| PFR Controller | 546 (499) | 256 (256) | 6 | 3 | 135 (134) |
| R Controller | 524 (476) | 464 (464) | 16 | 8 | 298 (298) |
| EPLL (freq estimation) | 271 (271) | 125 (125) | 0 | 0 | 45 (45) |

To evaluate the static and dynamic performance of the controller, both startup transients and load change responses were considered for the conventional resonant controller in δ domain and the embodiment described herein. FIG. 20 shows startup performance of the system when the conventional R controller is used. The load is about 200Ω and purely resistive. The load current and voltage waveforms are shown in this figure. Very fast response with no steady-state error is observed. In the simulation in FIG. 21, a load change is applied where a new RL load with approximate values of R=200Ω and L=0.9 H is added in parallel with the original load. The load current and voltage waveforms are shown in FIG. 21 for the conventional R controller.

The same scenarios are presented for the PFR controller and the results are shown in FIGS. 22 and 23, respectively. The startup stage of the PFR controller is slightly slower than the conventional method and this is due to the fact that the division operation is replaced by a fixed multiplication obtained from the expected steady-state value. The response to load change is almost identical for both methods.

1.6.2 Control of Grid-Connected Inverter

An exemplary embodiment of a PFR controller used with a grid-connected inverter with an LCL output filter is shown in FIG. 24X. In this example the PFR controller is used in the control loop to regulate the output current. To remove harmonics of the output current the PFR controller may also be used as shown in FIG. 24X, or by using PFR controller blocks in parallel with the RES or PFR block in the loop. In embodiments where PFR blocks are used for harmonic cancelation, the center frequency of each PFR block should be selected as the multiplication of the grid frequency ($\omega_o''$) and the number of the selected harmonic (h) to be cancelled, i.e., $h\omega_o''$.

2. Resonant Controller with Low Sampling Frequency

In digital control systems for power electronics, it is desirable to have equal and synchronous sampling and switching frequencies because higher or asynchronous sampling frequency results in multi-rate digital systems and/or distortion in the system. However, the switching frequency is limited in some high-power applications. Accordingly, also provided herein are embodiments with robust features at low sampling frequency, which are advantageous in, for example, such high-power applications, as well as other applications that have difficulty with high switching and sampling rates. Low sampling frequency robust embodiments of the resonant controller offer an inherent frequency-adaptive characteristic that is implementable with low computational load and without requiring additional trigonometric functions.

2.1 Structure

A discrete time version of equation set (10) was obtained using first-order integration as described above, and the block diagram is shown in FIG. 12. The design may be modified to be frequency adaptive, wherein the center frequency $\omega_o$ of the resonant controller adjusts with frequency variations, by adding another integrator in the loop as shown in FIG. 17, as described above (see section 1.5).

2.2 Robustness Analysis

Results of a simplified robustness analysis are summarized in the following theorem.

Theorem. Consider a standard feedback loop R controller where the plant transfer function is G(s)=1 and the resonant controller transfer function of $$G_R(s) = \frac{\mu s}{s^2 + \omega_o^2}$$

is used. Consider the two following cases:

Case-I. The resonant controller is digitized using the Tustin method with pre-warping at $\omega_o$. This results in the discrete-time transfer function of $$\tilde{G}_R(z) = \frac{U(z)}{E(z)} = a\frac{z^2 - 1}{z^2 - 2bz + 1}, \quad (13)$$

$$\text{where } a = \frac{\sin(\omega_o T)}{2\omega_o} \text{ and } b = \cos(\omega_o T).$$

Case-II. The resonant controller may be realized using the discrete-time equations set forth above, i.e., $$A[n] = A[n-1] + T\mu e[n]\sin(\phi[n-1]) \quad (14)$$

$$\phi[n] = \phi[n-1] + \omega_o T + T\mu \frac{e[n]}{A[n]}\cos(\phi[n-1])$$

$$u[n] = A[n]\sin(\phi[n]).$$

The closed-loop system in Case-II has more robust performance than the system of Case-I with respect to errors caused by lower values of the sampling frequency.

Proof. The closed-loop system in Case-I has the following discrete-time transfer function:

$$\tilde{T}(z) = \frac{Y(z)}{R(z)} = \frac{\tilde{G}_R(z)}{1+\tilde{G}_R(z)} = \frac{a}{1+a}\frac{z^2-1}{z^2 - \frac{2b}{1+\mu a}z + \frac{1-\mu a}{1+\mu a}}. \quad (15)$$

Locations of the poles of this transfer function for six values of sampling frequency equal to 1000, 900, 800, 700, 600 and 500 Hz are shown in FIG. 25. (In FIG. 25, rather than plot the poles on the z-plane, they are transformed by $z = e^{sT}$ and plotted on the s-plane, for better visualization.) The other parameters of this system are $\omega_o = 2\pi 60$ and $\mu = \omega_o$. It is observed that the poles shift towards right hand of the complex plane with an increasing pace as the sampling frequency decreases. This shows that the system stability margins are being reduced as the sampling frequency decreases, as expected.

The discrete-time system in Case-II is not representable as a set of linear equations and thus, the above transfer function approach cannot be applied to it. However, it is possible to derive the nonlinear equations and linearize them around their desired equilibrium point to obtain a sense of how the eigenvalues change as the sampling frequency varies. To do this, assume that the input signal is given by $r[n] = A_o \sin(\omega_o nT + \delta_o)$ and substitute this into (14) to yield $$A[n] = A[n-1] + \quad (16)$$

$$T\mu\{A_o\sin(\omega_o nT + \delta_o) - A[n-1]\sin(\phi[n-1])\}\sin(\phi[n-1])$$

$$\phi[n] = \phi[n-1] + \omega_o T + T\mu\frac{\cos(\phi[n-1])}{A[n]}$$

$$\{A_o\sin(\omega_o nT + \delta_o) - A[n-1]\sin(\phi[n-1])\}.$$

Define the new variable $\delta[n]$ as $\delta[n] = \phi[n] - (n+1)\omega_o T$ to arrive at $$A[n] = A[n-1] + \mu T \left\{\begin{array}{l} A_o\sin(\omega_o nT + \delta_o)\times \\ \sin(n\omega_o T + \delta[n-1]) - \\ A[n-1]\sin^2(n\omega_o T + \delta[n-1]) \end{array}\right\} \quad (17)$$

$$\delta[n] = \delta[n-1] +$$

$$\frac{\mu T}{A[n]}\left\{\begin{array}{l} A_o\sin(\omega_o nT + \delta_o)\cos(\omega_o nT + \delta[n-1]) - \\ A[n-1]\sin(\omega_o nT + \delta[n-1])\cos(\omega_o nT + \delta[n-1]) \end{array}\right\}.$$

Assuming that $\mu = \epsilon\hat{\mu}$, and assuming that the sampling frequency is an integer multiple of the input frequency, the equation set of (17) is in the standard form to which the discrete averaging theorem can be applied. The averaged system will have the following difference equations:

$$\overline{A}[n] = \overline{A}[n-1] + \frac{\mu T}{2}\{A_o\cos(\delta_o - \overline{\delta}[n-1]) - \overline{A}[n-1]\} \quad (18)$$

$$\overline{\delta}[n] = \overline{\delta}[n-1] + \frac{\mu TA_o}{2\overline{A}[n]}\sin(\delta_o - \overline{\delta}[n-1]).$$

The difference equations (18) are nonlinear and has have an equilibrium point at $(\overline{A}, \overline{\delta}) = (A_o, \delta_o)$. Linearizing these equations around the equilibrium point results in $$\overline{\Delta A}[n] = \left(1 - \frac{\mu T}{2}\right)\overline{\Delta A}[n-1] \quad (19)$$

$$\overline{\Delta \delta}[n] = \left(1 - \frac{\mu T}{2}\right)\overline{\Delta \delta}[n-1].$$

Locus of closed-loop poles of this set of equations for $\mu = \omega_o$, and again when transformed to the s-plane, is shown in FIG. 26 for six different values of sampling frequency uniformly ranging from 1000 Hz to 500 Hz. The poles are located on the real axis because they represent the averaged system. The original system will then have complex conjugate poles but the real parts remain identical with the averaged system. It is noted that the poles move towards the left side as the sampling frequency decreases. This means that the system's damping ratio increases and therefore, the stability margins are increased. This phenomenon is confirmed by the simulation results below, where it is observed that the system experiences smaller oscillations when the sampling frequency decreases. This is in contrast with conventional resonant control.

It is noted that the above analysis is approximate and local. Excessive reduction of sampling frequency causes the nonlinear terms to become dominant and the system shifts towards instability. However, the system starts exhibiting this instability at a much lower value of the sampling frequency as compared to Case-I.

2.3 Results

To demonstrate the robustness of the controller for low sampling frequency, three typical examples were studied: a first-order plant $$G_1(s) = \frac{1}{\tau s + 1},$$

a second-order plant $$G_2(s) = \frac{\omega_n^2}{s^2 + 2\zeta\omega_n s + \omega_n^2}$$

and a third-order plant $$G_3(s) = \frac{\omega_n^2}{(\tau s + 1)(s^2 + 2\zeta\omega_n s + \omega_n^2)}.$$

The system parameters were $$\tau = \frac{1}{200\pi} = \omega_n$$

and ζ=0.5. The center frequency of the resonant controller was $\omega_o=100\pi$ and the gain was μ=444, 155, and 88 for the three systems, respectively. The gains were obtained using pole placement on the complex plane. The locations of closed-loop poles were {−207±496i, −215} for the first-order, {−174±427i, −141±404i} for the second-order, and {−540, −340±480i, −18±361i} for the third-order plant. The resonant controller was designed such that the analog closed loop systems exhibited good transient responses. The conventional resonant controller was realized using the transfer function (3) and the proposed controller is realized using (10). The input signal was a sinusoid at frequency $\omega_o$ whose amplitude and phase angle experience step changes.

The closed-loop tracking error for the first-order system is shown in FIG. 27 for three different sampling frequencies of 2000 Hz (high), 1000 Hz (medium), and 500 Hz (low). At the high sampling frequency, both controllers perform almost identically. However, at medium sampling frequency, the conventional resonant controller shows some oscillations while the inventive controller retains its performance. At the low sampling frequency, the inventive controller is still operating desirably while the conventional resonant controller exhibits large oscillations. Locus of the closed-loop poles of the digital system with conventional R controller when the sampling period increases from 0.2 ms to 2 ms is shown in FIG. 28. Increasing the sampling interval pushes the closed-loop poles towards the imaginary axis, hence reducing the system phase margin and increasing the level of system oscillations. The same conclusion is made for second-order and third-order plants (FIG. 29 and FIG. 30) with increased level of oscillations. In the figures, it is observed that damping of responses slightly increases in the all three embodiments when the sampling frequency decreases. This is in contrast with the conventional resonant controller, but it is consistent with the results of the robustness analysis presented above.

In the last simulation, the input signal frequency experienced a jump of 1 Hz in the closed-loop system with the first-order plant. A conventional resonant controller, a non-adaptive resonant controller embodiment, and a frequency-adaptive resonant controller embodiment were implemented with a 1 kHz sampling frequency and their performances were compared. As shown in FIG. 31, the frequency-adaptive resonant controller embodiment completely removed the tracking error in the steady state, demonstrating that it adjusted to the variations in the input frequency.

3. Generalized Resonant Controller

A resonant controller as provided herein may be generalized to a general second-order transfer function as shown in FIG. 32. This generalized embodiment represents the transfer function:

$$\frac{k_1(s+\alpha)+k_o\omega_o}{(s+\alpha)^2+\omega_o^2},$$

relative to embodiments described above which implemented the transfer function (1).

Since every transfer function of order 2 or higher can be broken into transfer functions of order 1 and 2 using the method of partial fractions, it will be appreciated that the embodiments described herein may be used to implement any general transfer function of any order, for example, any order equal to two or higher than two.

The contents of all references, pending patent applications, and published patents cited throughout this application are hereby expressly incorporated by reference.

EQUIVALENTS

Those skilled in the art will recognize or be able to ascertain variants of the embodiments described herein. Such variants are within the scope of the invention and are covered by the appended claims.

REFERENCES

[1] Guillaud, X., et al. Use of resonant controller for grid-connected converters in case of large frequency fluctuations. *Power Electronics and Applications,* 2007 *European Conference on,* pages 1-8, 2008.
[2] Timbus, A. V., et al. Adaptive resonant controller for grid-connected converters in distributed power generation systems. In *Applied Power Electronics Conference and Exposition,* 2006. *APEC'06. Twenty-First Annual IEEE,* pages 1601-1606. IEEE, 2006.
[3] Karimi-Ghartemani, M., et al. Linear quadratic output tracking and disturbance rejection. *International Journal of control,* 84:1442-1449, 2011.
[4] Karimi-Ghartemani, M., et al. Efficient linear controller design for power electronic converters. IEEE-ICPCES, pages 1-5, 2010.

The invention claimed is:
1. A second-order controller for a power inverter control system, comprising:
an input that receives an error signal corresponding to the power inverter output voltage or current;
first and second control loops that operate substantially independently;
wherein the first control loop is an amplitude control loop and the second loop is a phase control loop;
wherein the phase control loop receives a signal corresponding to a fundamental system frequency of the output voltage or current and produces a phase signal, and adjusts the phase signal according to the error signal and a cosine of the phase signal;
wherein the amplitude control loop adjusts the error signal according to a sine of the phase signal to produce an output signal that controls the power inverter.
2. The second-order controller of claim 1, wherein:
the amplitude control loop operates at an amplitude that is proportional to an amplitude of an input signal at the fundamental system frequency and at a selected harmonic of the fundamental system frequency; and
the phase control loop operates at the fundamental system frequency and at a selected harmonic of the fundamental system frequency.
3. The second-order controller of claim 1; wherein the phase control loop is adaptable to the fundamental system frequency or to a selected harmonic of the fundamental system frequency.
4. The second-order controller of claim 1, implemented in a digital domain.
5. The second-order controller of claim 1, implemented in an analogue domain.
6. The second-order controller of claim 3, implemented in a digital domain.
7. The second-order controller of claim 3, implemented in an analogue domain.

8. The second-order controller of claim 4, wherein:
the second-order controller requires a number of bits to satisfy a stability criterion;
wherein the number of bits is less than a number of bits required by a second-order controller having a combined amplitude and phase control loop to satisfy a stability criterion.

9. The second-order controller of claim 4, wherein:
the second-order controller is stable over a range of sampling frequencies;
wherein the range of sampling frequencies is broader than a range of sampling frequencies over which a second-order controller having a combined amplitude and phase control loop is stable.

10. A n-order controller for a power inverter control system, comprising;
at least one controller according to claim 1;
wherein n is three or more.

11. The second-order controller of claim 1, wherein the power inverter control system includes one or more of a distributed generation (DG) system, a microinverter for a photovoltaic system, a grid-connected inverter, a grid-isolated inverter, an uninterruptible power supply (UPS), an off-grid DG system, a permanent magnet synchronous motor drive, an active power filter, and a flexible ac transmission system.

12. A second-order control method for a power inverter control system, comprising:
receiving an error signal corresponding to the power inverter output voltage or current;
operating first and second control loops substantially independently;
wherein the first control loop is an amplitude control loop and the second loop is a phase control loop;
wherein the phase control loop receives a signal corresponding to a fundamental system frequency of the output voltage or current and produces a phase signal, and adjusts the phase signal according to the error signal and a cosine of the phase signal;
wherein the amplitude control loop adjusts the error signal according to a sine of the phase signal to produce an output signal that controls the power inverter.

13. The second-order control method of claim 12, comprising:
operating the amplitude control loop at an amplitude that is proportional to an amplitude of an input signal at the fundamental system frequency and at a selected harmonic of the fundamental system frequency; and
operating the phase control loop at the fundamental system frequency and at a selected harmonic of the fundamental system frequency.

14. The second-order control method of claim 12, wherein operating the phase control loop includes adapting to the fundamental system frequency or to a selected harmonic of the fundamental system frequency.

15. The second-order control method of claim 12, including operating the method in a digital domain.

16. The second-order control method of claim 12, including operating the method in an analogue domain.

17. The second-order control method of claim 14, including operating the method in a digital domain.

18. The second-order control method of claim 14, including operating the method in an analogue domain.

19. The second-order control method of claim 15, wherein:
operating requires a number of bits to satisfy a stability criterion;
wherein the number of bits is less than a number of bits required by a second-order controller having a combined amplitude and phase control loop to satisfy a stability criterion.

20. The second-order control method of claim 15, including:
operating such that the method is stable over a range of sampling frequencies;
wherein the range of sampling frequencies is broader than a range of sampling frequencies over which a second-order controller having a combined amplitude and phase control loop is stable.

21. An n-order control method for a power inverter control system, comprising;
operating at least one controller according to claim 12;
wherein n is three or more.

22. The second-order control method of claim 12, including controlling a power inverter in a system comprising one or more of a distributed generation (DG) system, a microinverter for a photovoltaic system, a grid-connected inverter, a grid-isolated inverter, an uninterruptible power supply (UPS), an off-grid DG system, a permanent magnet synchronous motor drive, an active power filter, and a flexible ac transmission system.

* * * * *